United States Patent
Kawamae et al.

(10) Patent No.: US 12,387,442 B2
(45) Date of Patent: *Aug. 12, 2025

(54) MIXED REALITY DISPLAY DEVICE AND MIXED REALITY DISPLAY METHOD

(71) Applicant: Maxell, Ltd., Kyoto (JP)

(72) Inventors: Osamu Kawamae, Kyoto (JP); Masuo Oku, Kyoto (JP)

(73) Assignee: Maxell, Ltd., Kyoto (JP)

(*) Notice: Subject to any disclaimer, the term of this patent is extended or adjusted under 35 U.S.C. 154(b) by 0 days.

This patent is subject to a terminal disclaimer.

(21) Appl. No.: 18/637,053

(22) Filed: Apr. 16, 2024

(65) Prior Publication Data
US 2024/0265651 A1 Aug. 8, 2024

Related U.S. Application Data

(63) Continuation of application No. 17/428,646, filed as application No. PCT/JP2019/004191 on Feb. 6, 2019, now Pat. No. 11,989,838.

(51) Int. Cl.
*G06T 7/194* (2017.01)
*G06F 3/01* (2006.01)
(Continued)

(52) U.S. Cl.
CPC ............ *G06T 19/006* (2013.01); *G06F 3/011* (2013.01); *G06F 3/1454* (2013.01); *G06T 7/194* (2017.01);
(Continued)

(58) Field of Classification Search
CPC ......... G06T 19/006; G06T 7/194; G06T 7/50; G06T 15/40; G06T 19/20;
(Continued)

(56) References Cited

U.S. PATENT DOCUMENTS 6,329,986 B1   12/2001   Cheng
6,421,047 B1 *  7/2002   de Groot ................. A63F 13/70
                                                          345/473
(Continued)

FOREIGN PATENT DOCUMENTS

JP   2000-011203 A   1/2000
JP   2002-245294 A   8/2002
(Continued)

OTHER PUBLICATIONS

Zheren Yu, et al., "An Augmented Reality based Cooperative Modeling System and Interface of Interactive Operation", Proceedings of the Media Computing Conference, Jun. 18, 2016, pp. 1-4.
(Continued)

*Primary Examiner* — Jitesh Patel
(74) *Attorney, Agent, or Firm* — Mattingly & Malur, PC

(57) ABSTRACT

The MR display device includes a controller and a display unit. The controller recognizes a reality object from a reality video imaged by a camera and links a predetermined virtual object to the reality object based on an operation of an experiencing person. The display unit displays a video of the linked virtual object. The controller acquires a recognition result of a reality object generated by the other MR display device and data of the linked virtual object, via a communication unit, synthesizes the acquired data and the own data, and displays a video obtained by the synthesis on the display unit. In addition, the controller allows an edit of the virtual object linked to the reality object on the video displayed on the display unit, based on an operation of the experiencing person.

19 Claims, 28 Drawing Sheets

(51) Int. Cl.
*G06F 3/14* (2006.01)
*G06T 7/50* (2017.01)
*G06T 15/40* (2011.01)
*G06T 19/00* (2011.01)
*G06T 19/20* (2011.01)
*G06V 20/20* (2022.01)
*H04L 67/131* (2022.01)
*H04N 13/363* (2018.01)

(52) U.S. Cl.
CPC .............. *G06T 7/50* (2017.01); *G06T 15/40* (2013.01); *G06T 19/20* (2013.01); *G06V 20/20* (2022.01); *H04L 67/131* (2022.05); *H04N 13/363* (2018.05); *G06T 2219/024* (2013.01)

(58) Field of Classification Search
CPC ........... G06T 2219/024; G06T 2200/24; G06T 2210/04; G06T 2219/2016; G06T 2219/2021; G06T 2219/2024; G06F 3/011; G06F 3/1454; G06F 3/1423; G06F 3/012; G06F 13/00; G06V 20/20; H04L 67/131; H04N 13/363; G02B 27/017; G09G 2360/144; G09G 2370/16
See application file for complete search history.

(56) References Cited

U.S. PATENT DOCUMENTS

| | | | |
|---|---|---|---|
| 9,503,681 B1* | 11/2016 | Popescu | G06F 40/169 |
| 10,225,656 B1 | 3/2019 | Kratz et al. | |
| 2004/0189675 A1* | 9/2004 | Pretlove | G06F 3/1454 |
| | | | 348/E7.087 |
| 2005/0132288 A1 | 6/2005 | Kirn et al. | |
| 2012/0249591 A1 | 10/2012 | Maciocci et al. | |
| 2013/0141419 A1* | 6/2013 | Mount | G09G 3/003 |
| | | | 345/419 |
| 2013/0234934 A1* | 9/2013 | Champion | G06F 3/0346 |
| | | | 345/156 |
| 2014/0132629 A1* | 5/2014 | Pandey | G06T 11/001 |
| | | | 345/633 |
| 2014/0184496 A1* | 7/2014 | Gribetz | G02B 27/017 |
| | | | 345/156 |
| 2014/0368537 A1 | 12/2014 | Salter et al. | |
| 2015/0231490 A1 | 8/2015 | Graepel et al. | |
| 2015/0235398 A1* | 8/2015 | Kim | G06T 7/194 |
| | | | 345/633 |
| 2016/0098862 A1 | 4/2016 | Wilson et al. | |
| 2016/0187969 A1* | 6/2016 | Larsen | G02B 27/0093 |
| | | | 345/156 |
| 2016/0357491 A1 | 12/2016 | Oya | |
| 2017/0053446 A1* | 2/2017 | Chen | G06T 19/006 |
| 2017/0124717 A1 | 5/2017 | Baruch et al. | |
| 2017/0243403 A1 | 8/2017 | Daniels et al. | |
| 2018/0219975 A1 | 8/2018 | Leppanen et al. | |
| 2019/0035153 A1* | 1/2019 | Dange | G06V 20/20 |
| 2019/0073831 A1* | 3/2019 | Kim | G06F 3/011 |
| 2019/0082118 A1* | 3/2019 | Wang | H04N 5/265 |
| 2019/0279407 A1 | 9/2019 | McHugh et al. | |

FOREIGN PATENT DOCUMENTS

| | | |
|---|---|---|
| JP | 2007-514235 A | 5/2007 |
| JP | 2015-228256 A | 12/2015 |
| JP | 2016-224810 A | 12/2016 |
| JP | 2017-538990 A | 12/2017 |

OTHER PUBLICATIONS

Fumihisa Shibata, et al., "Design and Implementation of Contents Description Language for Mobile Mixed Reality System", IEICE Technical Report, vol. 105, No. 533, Jan. 12, 2006, pp. 19-24.

International Search Report of PCT/JP2019/004191 dated Feb. 6, 2019.

* cited by examiner

F I G. 1A
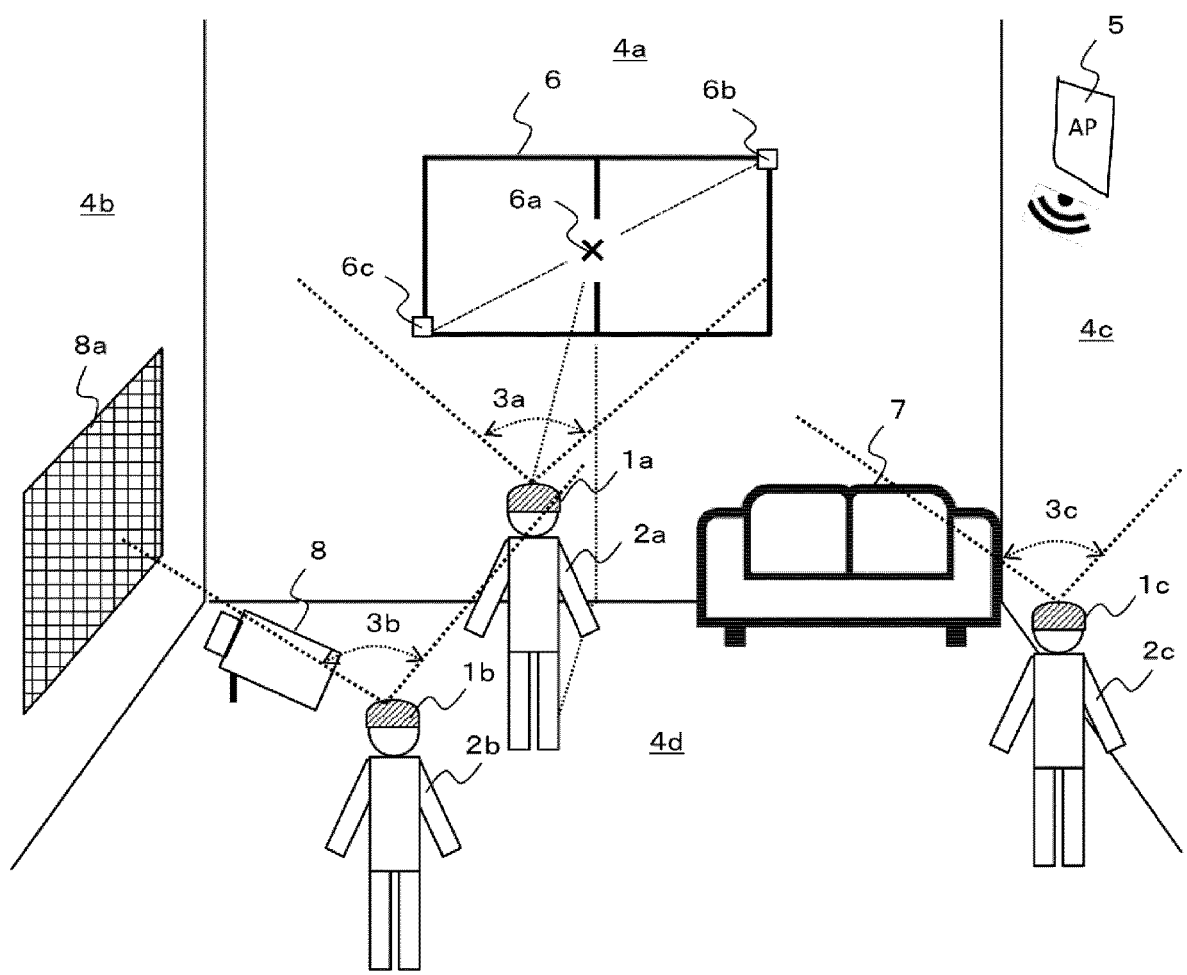

F I G. 2
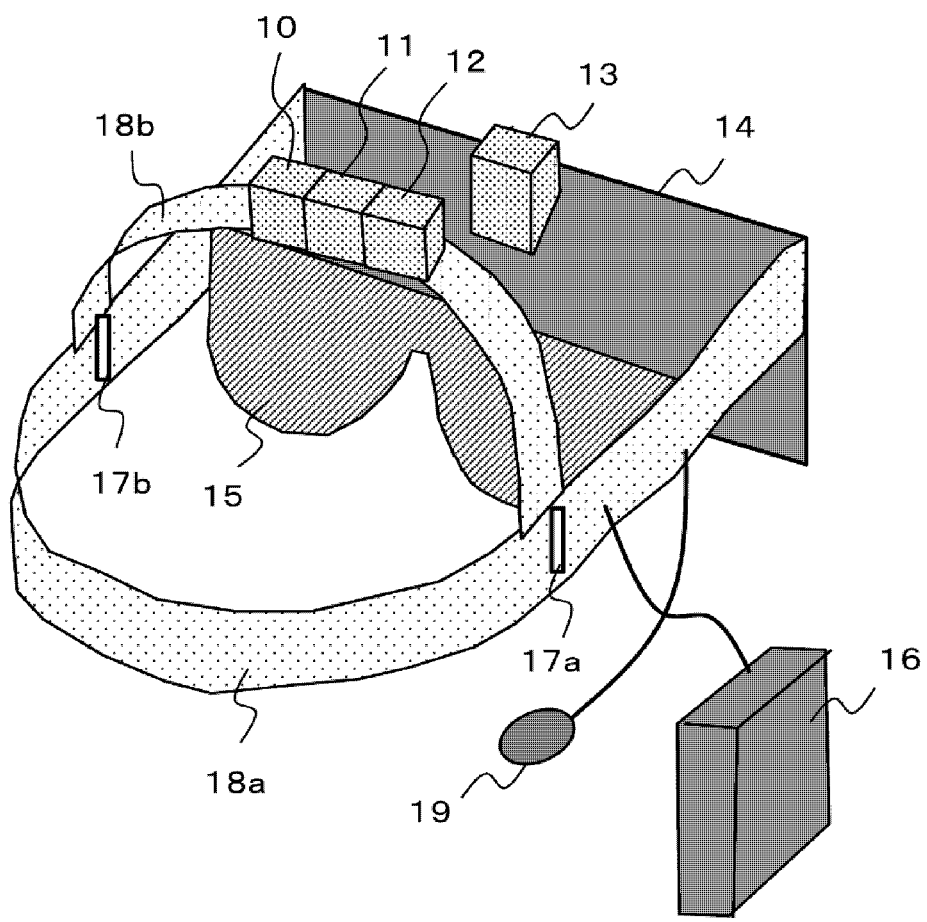

F I G. 4 A
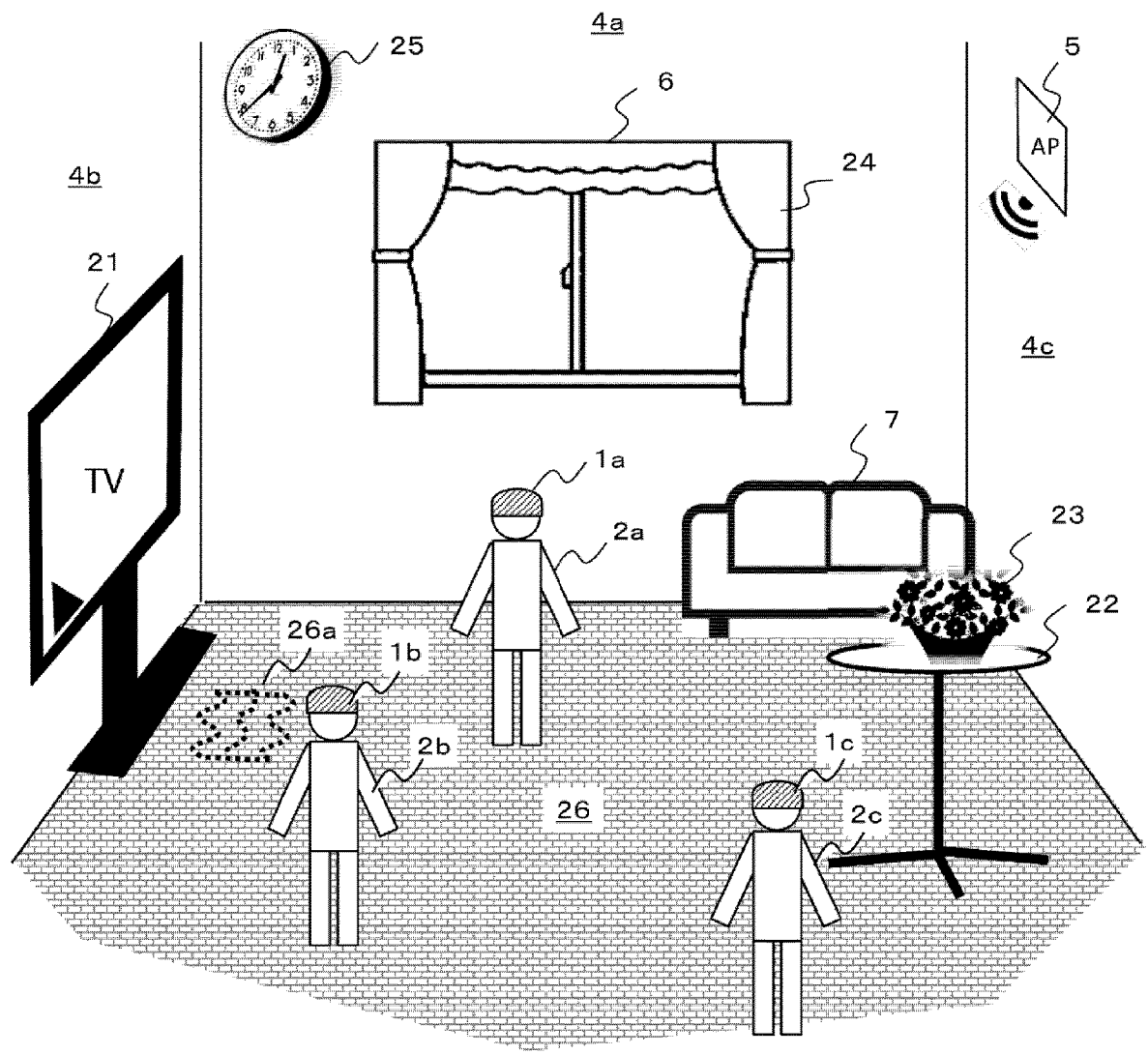

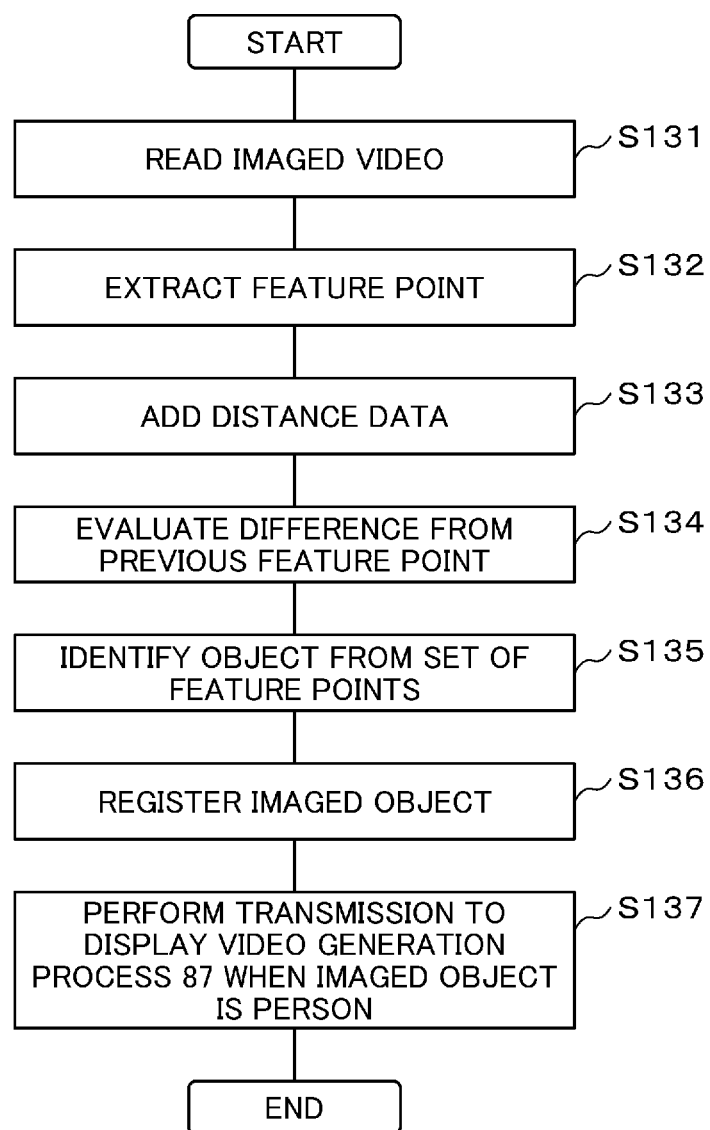

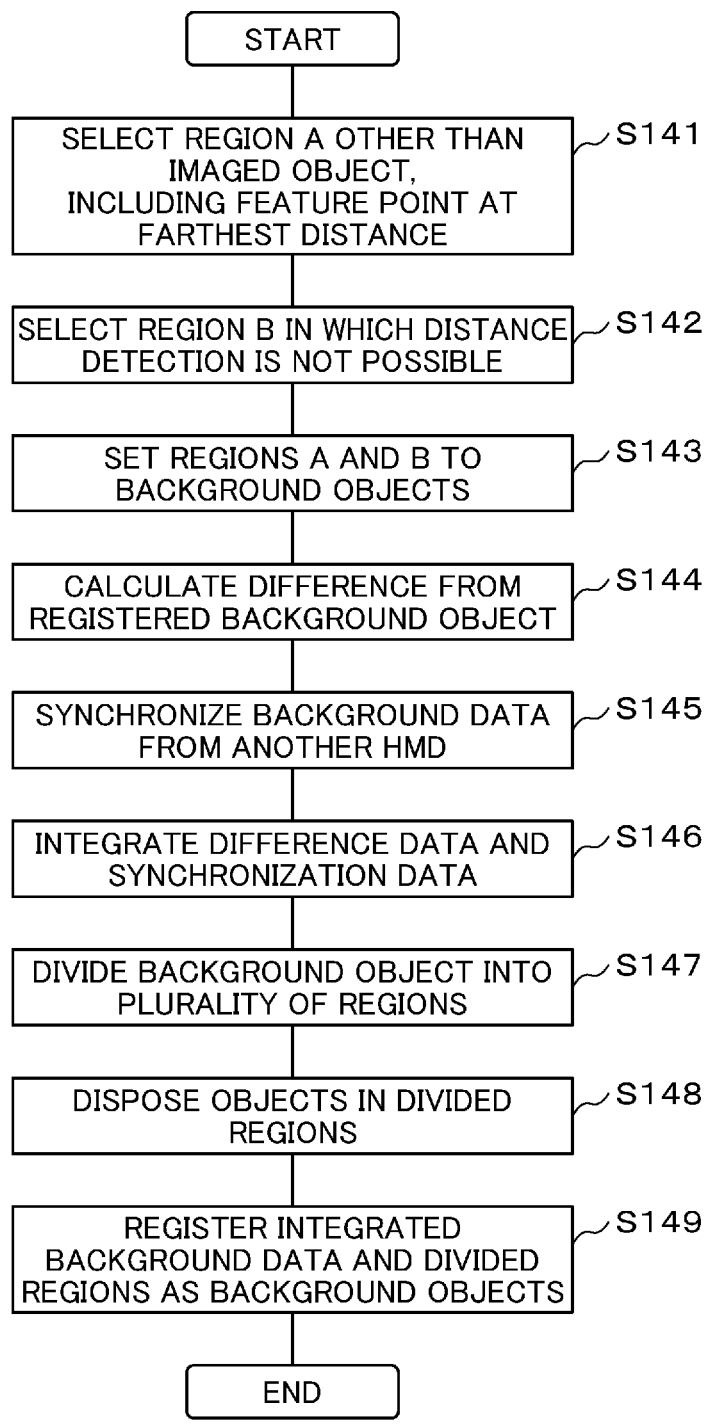

F I G. 1 3 A

| CONTENT ID | 550e8400-e29b-41d4-a716-446655440000 | |
|---|---|---|
| CONTENT TYPE | HEADER | |
| CONTENT NAME | MR EXPERIENCE | |
| CONTENT HOLDER | MR EXPERIENCING PERSON 2 | |
| COPYRIGHT | DEDICATED FOR PLAYING, REUSE PROHIBITED | |
| ACCOMPANYING CONTENTS | REFERENCE POINT AND MOVEMENT HISTORY DATA | ○ |
| | IMAGED OBJECT DATA | ○ |
| | BACKGROUND OBJECT DATA | ○ |
| | AR OBJECT DATA | ○ |

F I G. 1 3 B

| CONTENT ID | 550e8400-e29b-41d4-a716-446655440000 | | | |
|---|---|---|---|---|
| CONTENT TYPE | REFERENCE POINT AND MOVEMENT HISTORY DATA | | | |
| REFERENCE POINT (WITH TIME) | T0=20181123T092736+0900 | PBase={(0, 0, 0), (0, 0)} | | |
| MOVEMENT HISTORY (WITH TIME) | T1=20181123T092912+0900 | MP1={(r1, $\theta 1$, $\phi 1$), ($\theta\theta 1$, $\phi\phi 1$)} | | |
| | T2=20181123T093052+0900 | MP2={(r2, $\theta 2$, $\phi 2$), ($\theta\theta 2$, $\phi\phi 2$)} | | |

F I G. 1 3 C

| CONTENT ID | 550e8400-e29b-41d4-a716-446655440000 | |
|---|---|---|
| CONTENT TYPE | IMAGED OBJECT DATA | |
| IMAGING POSITION | REFERENCE POSITION (PBase) | |
| IMAGED OBJECT 1 | OBJECT NAME=WINDOW | PRIORITY FLAG=1001 |
| FEATURE POINT 1 | DISTANCE=R1 | DIRECTION=($\theta\theta 3, \phi\phi 3$) |
| FEATURE POINT 2 | DISTANCE=R2 | DIRECTION=($\theta\theta 4, \phi\phi 4$) |
| ⋮ | ⋮ | ⋮ |
| LINKED AR OBJECT 1 | DATA ID=abhk.good.xxz.3052 | |
| LINKING POSITION | FEATURE POINT 2 | OFFSET=(r3, $\theta 3, \phi 3$) |
| SIZE | ×1.5 | |
| ROTATION | ($\theta\theta 5, \phi\phi 5$) | |
| IMAGED OBJECT 2 | OBJECT NAME=PROJECTOR | PRIORITY FLAG=0010 |
| FEATURE POINT 1 | DISTANCE=R3 | DIRECTION=($\theta\theta 6, \phi\phi 6$) |
| ⋮ | ⋮ | ⋮ |
| LINKED AR OBJECT 2 | DATA ID=abcz.good.xyz.8012 | |
| LINKING POSITION | FEATURE POINT 1 | OFFSET=(r4, $\theta 4, \phi 4$) |
| SIZE | ×1.5 | |
| ROTATION | ($\theta\theta 7, \phi\phi 7$) | |
| IMAGED OBJECT 3 | OBJECT NAME = SOFA | PRIORITY FLAG=0101 |
| FEATURE POINT 1 | DISTANCE=R4 | DIRECTION=($\theta\theta 8, \phi\phi 8$) |
| ⋮ | ⋮ | ⋮ |
| IMAGING POSITION | MOVEMENT POSITION (MP1) | |
| IMAGED OBJECT 1 | OBJECT NAME=WINDOW | PRIORITY FLAG=1001 |
| FEATURE POINT 1 | DISTANCE=R1a | DIRECTION=($\theta\theta 3a, \phi\phi 3a$) |
| FEATURE POINT 2 | DISTANCE=R2a | DIRECTION=($\theta\theta 4a, \phi\phi 4a$) |
| ⋮ | ⋮ | ⋮ |
| LINKED AR OBJECT 1 | DATA ID=abhk.good.xxz.3052 | |
| LINKING POSITION | FEATURE POINT 2 | OFFSET=(r3a, $\theta 3a, \phi 3a$) |
| SIZE | ×1.5 | |
| ROTATION | ($\theta\theta 5a, \phi\phi 5a$) | |
| IMAGED OBJECT 2 | OBJECT NAME=PROJECTOR | PRIORITY FLAG=0010 |
| FEATURE POINT 1 | DISTANCE=R3a | DIRECTION=($\theta\theta 6a, \phi\phi 6a$) |
| ⋮ | ⋮ | ⋮ |

F I G. 1 3 D

| CONTENT ID | 550e8400-e29b-41d4-a716-446655440000 | |
|---|---|---|
| CONTENT TYPE | BACKGROUND OBJECT DATA | |
| IMAGING POSITION | REFERENCE POSITION (PBase) | |
| BACKGROUND OBJECT 1 | OBJECT NAME=ROOM | |
| FEATURE POINT 1 | DISTANCE=R6 | DIRECTION=($\theta\theta$a, $\Phi\Phi$a) |
| FEATURE POINT 2 | DISTANCE=R7 | DIRECTION=($\theta\theta$b, $\Phi\Phi$b) |
| ⋮ | ⋮ | ⋮ |
| BACKGROUND DATA | BITMAP DATA | |
| LINKED AR OBJECT 4 | DATA ID=xxxx.yyyy.zzz.1368 | PRIORITY FLAG=0101 |
| LINKING POSITION | FEATURE POINT 1 | OFFSET=(r3c, $\theta$3c, $\Phi$3c) |
| SIZE | ×1.5 | |
| ROTATION | ($\theta\theta$c, $\Phi\Phi$c) | |
| DIVIDED REGION DATA | REGION DIVISION INFORMATION | PRIORITY FLAG=1001 |
| CROSS OBJECT | 3D IMAGE DATA | |
| ⋮ | ⋮ | ⋮ |
| IMAGING POSITION | MOVEMENT POSITION (MP1) | |
| BACKGROUND OBJECT 1 | OBJECT NAME=ROOM | |
| FEATURE POINT 1 | DISTANCE=R8 | DIRECTION=($\theta\theta$e, $\Phi\Phi$e) |
| ⋮ | ⋮ | ⋮ |

F I G. 1 3 E

| CONTENT ID | 550e8400-e29b-41d4-a716-446655440000 |
|---|---|
| CONTENT TYPE | AR OBJECT DATA |
| AR OBJECT 1 | DATA ID=abhk.good.xxz.3052 |
| | TITLE=CURTAIN |
| | DESCRIPTION OF COPYRIGHT |
| | 3D IMAGE DATA |
| AR OBJECT 2 | DATA ID=abcz.good.xyz.8012 |
| | TITLE=FLAT TELEVISION |
| | DESCRIPTION OF COPYRIGHT |
| | 3D IMAGE DATA |
| AR OBJECT 3 | DATA ID=abcz.yyyy.xyz.8105 |
| | TITLE=TABLE |
| | DESCRIPTION OF COPYRIGHT |
| | 3D IMAGE DATA |
| AR OBJECT 4 | DATA ID=xxxx.yyyy.zzz.1368 |
| | TITLE=CLOCK |
| | DESCRIPTION OF COPYRIGHT |
| | 3D IMAGE DATA |
| ⋮ | ⋮ |

F I G. 1 6 A

| CONTENT ID | 550e8400-e29b-41d4-a716-446655440000 | |
|---|---|---|
| CONTENT TYPE | IMAGED OBJECT DATA | |
| IMAGING POSITION | REFERENCE POSITION (PBase) | |
| ⋮ | ⋮ | ⋮ |
| IMAGING POSITION | MOVEMENT POSITION (MP1) | |
| IMAGED OBJECT 1 | OBJECT NAME=WINDOW | PRIORITY FLAG=1001 |
| ⋮ | ⋮ | ⋮ |
| IMAGED OBJECT 2 | OBJECT NAME=PROJECTOR | PRIORITY FLAG=0010 |
| FEATURE POINT 1 | DISTANCE=R3 | DIRECTION=($\theta\theta6, \phi\phi6$) |
| ⋮ | ⋮ | ⋮ |
| LINKED AR OBJECT 2 | DATA ID=abcz.good.xyz.8012 | |
| LINKING POSITION | FEATURE POINT 1 | OFFSET=(r4, $\theta4, \phi4$) |
| SIZE | ×1.5 | |
| ROTATION | ($\theta\theta7, \phi\phi7$) | |
| COMPONENT 1 | DATA ID=abcz.good.xyz.8012a3 | PRIORITY FLAG=0010 |
| COMPONENT 2 | DATA ID=abcz.good.xyz.8012b2 | PRIORITY FLAG=0011 |
| COMPONENT 3 | DATA ID=abcz.good.xyz.8012c8 | PRIORITY FLAG=0100 |
| IMAGED OBJECT 3 | OBJECT NAME=SOFA | PRIORITY FLAG=0101 |
| ⋮ | ⋮ | ⋮ |

F I G. 1 6 B

| CONTENT ID | 550e8400-e29b-41d4-a716-446655440000 |
|---|---|
| CONTENT TYPE | AR OBJECT DATA |
| AR OBJECT 1 | DATA ID=abhk.good.xxz.3052 |
| | TITLE=CURTAIN |
| | ⋮ |
| AR OBJECT 2 | DATA ID=abcz.good.xyz.8012 |
| | TITLE=FLAT TELEVISION |
| | DESCRIPTION OF COPYRIGHT |
| PANEL | DATA ID=abcz.good.xyz.8012a3 |
| | 3D IMAGE DATA |
| SUPPORT | DATA ID=abcz.good.xyz.8012b2 |
| | 3D IMAGE DATA |
| PEDESTAL | DATA ID=abcz.good.xyz.8012c8 |
| | 3D IMAGE DATA |
| AR OBJECT 3 | DATA ID=abcz.yyyy.xyz.8105 |
| | TITLE=TABLE |
| | ⋮ |

F I G. 1 7
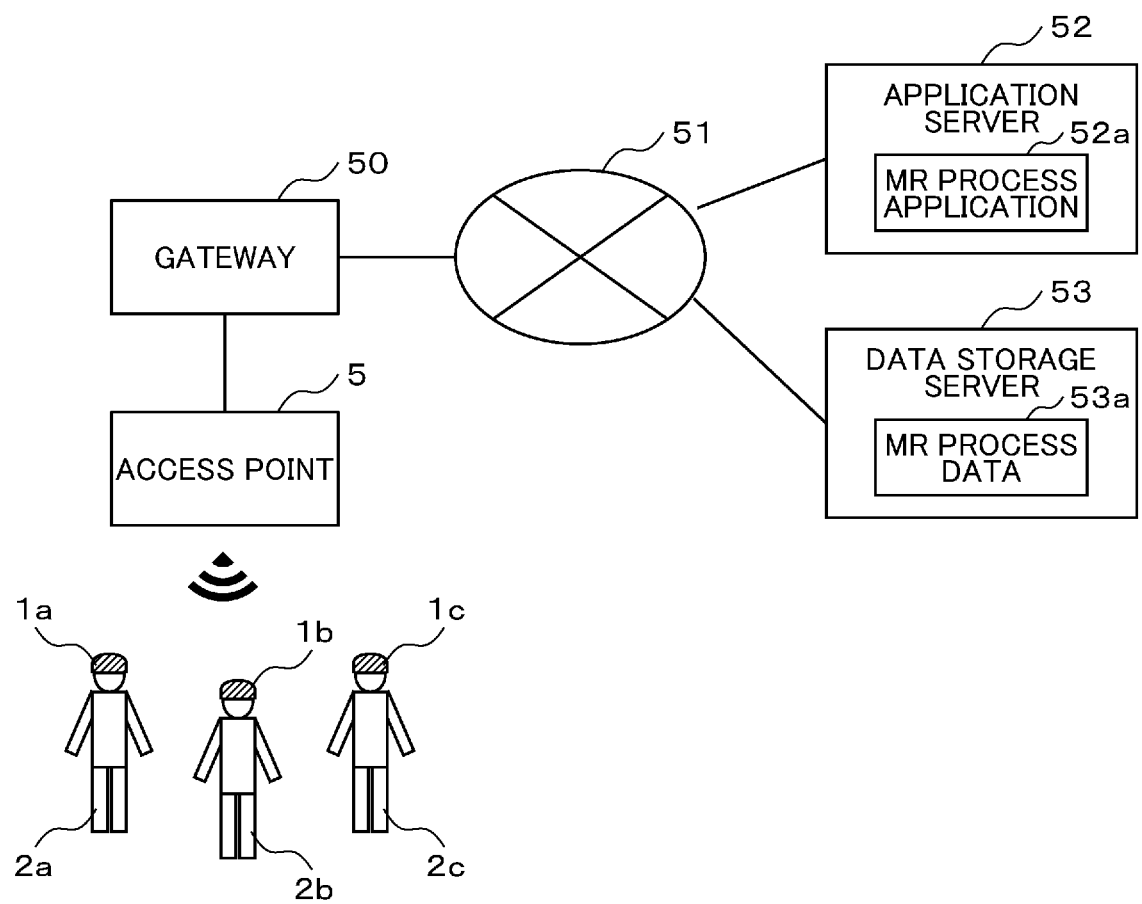

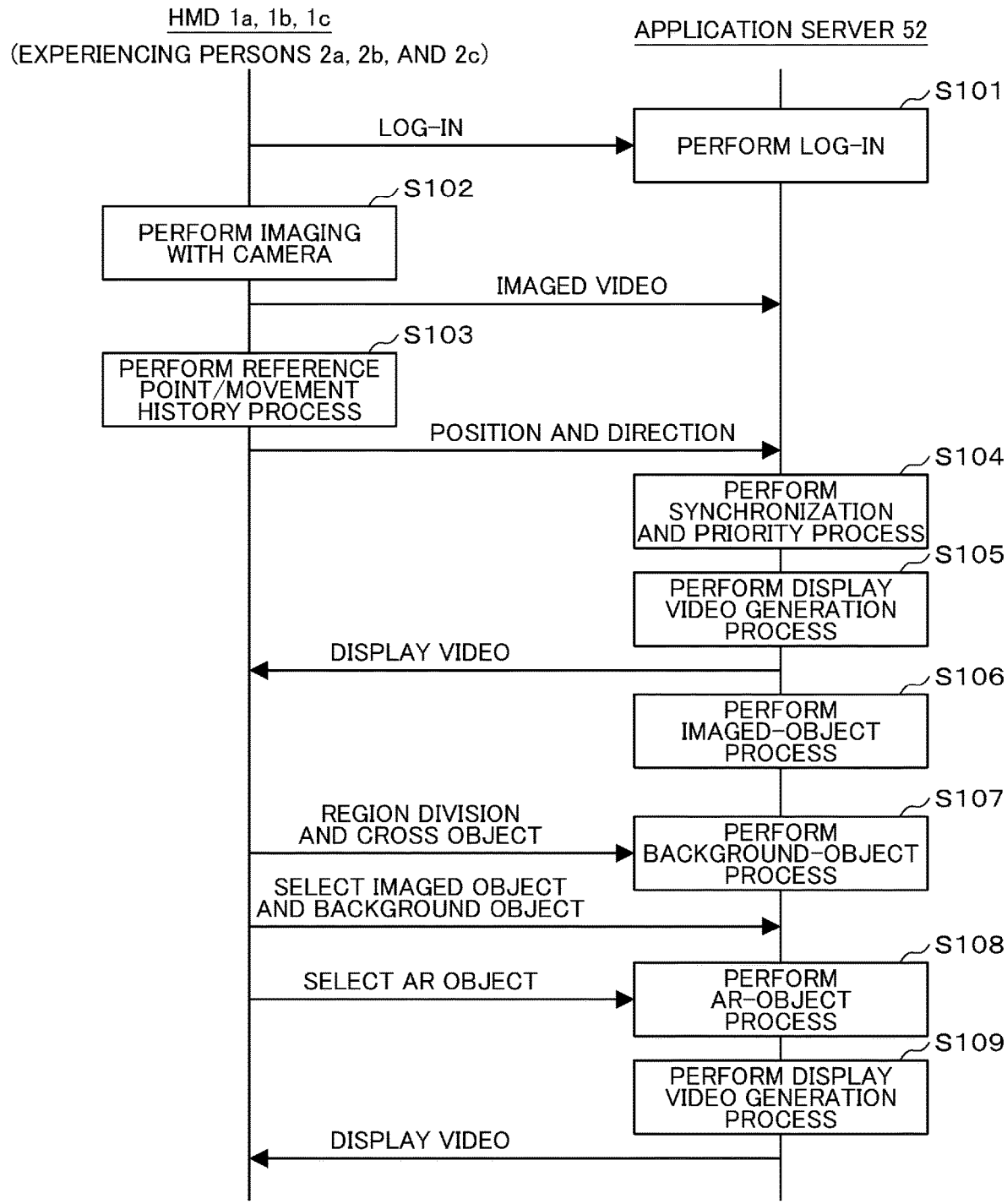
F I G. 1 8 A

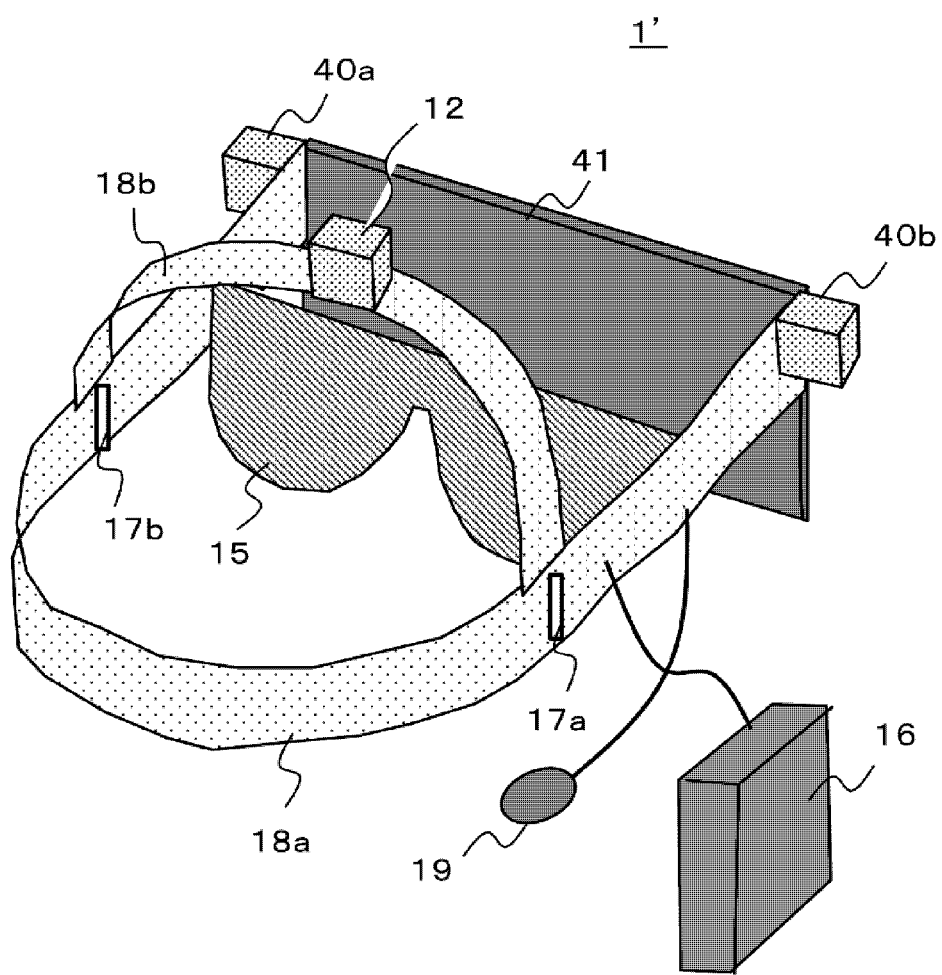
F I G. 1 9

MIXED REALITY DISPLAY DEVICE AND MIXED REALITY DISPLAY METHOD

TECHNICAL FIELD

The present invention relates to a mixed reality display device and a mixed reality display method for experiencing a mixed reality (MR) space obtained by synthesizing a real space and a virtual object. In particular, the present invention relates to a technology suitable for causing a plurality of MR experiencing persons to share an MR experience.

BACKGROUND ART

Adding an augmented reality (AR) object being a virtual object created by computer graphics (CG) or the like, to a real space or a reality video imaged by a camera is used for contents such as games or maintenance works. In order to add an AR object, a video called an AR trigger or marker is imaged simultaneously with the background with a camera, and an AR object to be linked by the AR trigger is synthesized with a reality video. In particular, in an MR experience, an AR object generated in accordance with the position and a posture of a head mounted display (HMD) is superimposed and displayed in the real space as a video of a virtual object, based on a video of the real space imaged by the camera mounted on the HMD. In the HMD, the camera and a display are integrated.

Regarding this, Patent Document 1 discloses an MR system in which a portable information terminal such as a tablet is combined in addition to the HMD in order to cause a plurality of persons to share an MR experience. Patent Document 1 discloses that, in this MR system, an MR video displayed on the HMD is also displayed on the tablet, and thus a user of the tablet can designate a virtual object in the shared MR video and cause the result of the designation to be applied to the MR video.

CITATION LIST

Patent Document

Patent Document 1: JP 2016-224810 A

SUMMARY OF THE INVENTION

Problems to be Solved by the Invention

However, in the method in Patent Document 1, the user of the portable information terminal can just designate the virtual object, and it is not possible for the user to perform an operation of disposing the virtual object in the real space or replacing the virtual object. In addition, the real space of the HMD can be shared, but sharing the own real space of the user of the portable information terminal is not possible.

As described above, in Patent Document 1, there are problems as follows. When a plurality of persons experience an MR space, it is not possible that other experiencing persons except for a person wearing the HMD perform an operation of disposing a virtual object in the real space or replacing the virtual object, further it is not possible to share real spaces of the other experiencing persons.

The present invention has been made in view of the above points. An object of the present invention is to provide a mixed reality display device and a mixed reality display method capable of enabling a plurality of experiencing persons to simultaneously perform an operation of disposing a virtual object in a real space, replacing the virtual object, or the like and to share real spaces of the plurality of experiencing persons.

Solutions to Problems

To solve the above problems, according to the present invention, a mixed reality display device is configured to be connected to other mixed reality display devices worn by other experiencing persons and to cause the experiencing persons to share the reality video and the video of the virtual object with each other. The mixed reality display device includes a camera that images a reality video, a controller that recognizes the reality object from the reality video imaged by the camera and links a predetermined virtual object to the recognized reality object based on an operation of the experiencing person, a display unit that displays a video of the linked virtual object, a memory that stores data of the virtual object linked to the reality object, and a communication unit that is connected to the other mixed reality display devices and transmits and receives data to and from each other. The controller acquires a recognition result of a reality object generated by the other mixed reality display device and data of the linked virtual object, via the communication unit, synthesizes the acquired data and the data stored in the memory, and displays a video obtained by the synthesis on the display unit. In addition, the controller allows an edit of the virtual object linked to the reality object on the video displayed on the display unit, based on an operation of the experiencing person.

Furthermore, according to the present invention, a mixed reality display method includes a step of imaging a reality video by each of the mixed reality display devices, a step of connecting the imaged reality videos to recognize a reality object, a step of linking a virtual object selected based on an operation of each of the experiencing persons to the reality object and performing synthesis, a step of displaying a common video based on synthesis data of the connected reality object and the linked virtual object, in each of the mixed reality display devices, and a step of causing the experiencing person of each of the mixed reality display devices to edit the virtual object linked to the reality object on the displayed video.

Effects of the Invention

According to the present invention, when a plurality of persons experience an MR space, it is possible for a plurality of experiencing persons to perform an operation of disposing a virtual object in a real space, replacing the virtual object, or the like, and to share real spaces of the plurality of experiencing persons.

BRIEF DESCRIPTION OF THE DRAWINGS

FIG. 1A is a view illustrating an example of a real space to which a plurality of MR display devices are applied.

FIG. 2 is a view illustrating an appearance configuration of an MR display device according to Example 1.

FIG. 4A is a view illustrating an example of an MR space in which AR objects are disposed.

FIG. 8 is a flowchart of an imaged-object process 84.

FIG. 9 is a flowchart of a background-object process 85.

FIG. 13A illustrates a data table of header data.

FIG. 13B illustrates a data table of reference point and movement history data 91.

FIG. 13C illustrates a data table of imaged object data 92.

FIG. 13D illustrates a data table of background object data 93.

FIG. 13E illustrates a data table of AR object data 94.

FIG. 16A illustrates a data table of the imaged object data.

FIG. 16B illustrates a data table of the AR object data.

FIG. 17 is a diagram illustrating a configuration of an MR network system according to Example 3.

FIG. 18A is a sequence chart of the MR network system.

FIG. 19 is a view illustrating an appearance configuration of an MR display device 1' according to Example 4.

MODE FOR CARRYING OUT THE INVENTION

Figure 1B:
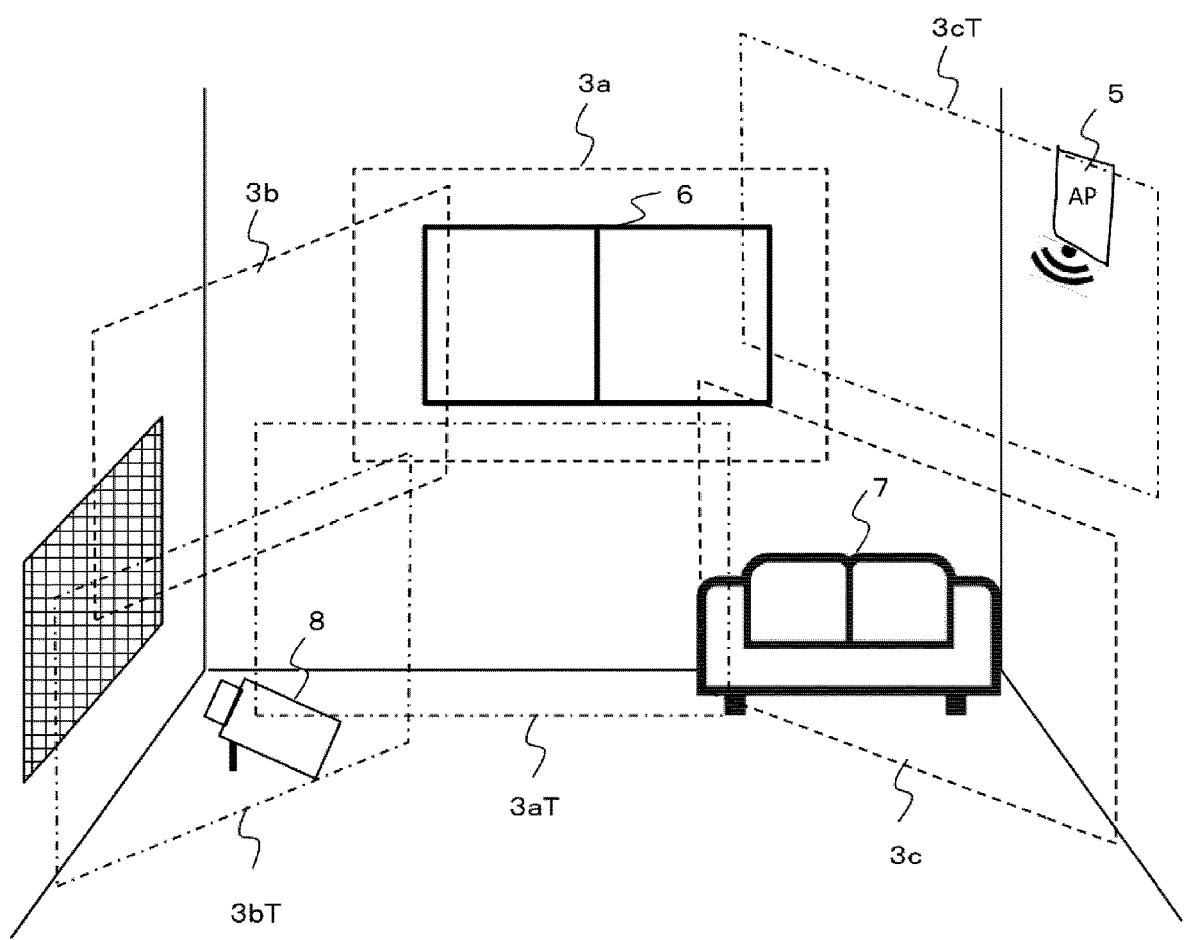
FIG. 1B is a view illustrating a state where background videos are connected.

Hereinafter, examples of the present invention will be described with reference to the drawings. A mixed reality display device is referred to as an MR display device or an HMD below.

Example 1

In Example 1, a system in which a plurality of MR display devices are connected to each other and data is transmitted and received between the MR display devices will be described.

[MR Display System]

FIG. 1A is a view illustrating an example of a real space to which a plurality of MR display devices are applied. In this system, three MR display devices (HMDs) 1a, 1b, and 1c are provided, and a plurality of experiencing persons 2a, 2b, and 2c in the MR space wear HMDs 1a, 1b, and 1c on the respective heads. As will be described later, each of the HMDs includes a camera, a distance measurement sensor, a display, a communication unit, and a position and direction sensor which are built therein. The camera images the real space, and the experiencing person visually recognizes an MR video by the MR video displayed on the display. Imaging angle of view of cameras built in the HMDs 1a, 1b, and 1c are indicated by reference signs 3a, 3b, and 3c, respectively. An access point (AP) 5 such as a wireless LAN is provided for communication between the HMDs 1a, 1b, and 1c. Since the positions of the experiencing persons (HMD) and the line-of-sight directions are different, the real spaces visually recognized by the experiencing persons are different. It is possible to experience a common MR video by communicating between the HMDs.

In the real space, walls 4a, 4b, and 4c and a floor 4d of a room are the background. A window 6, a sofa 7, a projector 8, and a projection screen 8a of the projector 8 are placed in the real space as reality objects. The MR experiencing persons 2a, 2b, and 2c experience MR in this real space. Specifically, an example in which a plurality of operators (MR experiencing persons) lay out the interior of the room is assumed.

In order to share the MR experience, the experiencing persons 2a, 2b, and 2c perform initial setting (coordinate alignment) of the line-of-sight direction (imaging direction of the camera), the position, and the height. For example, the reference of the imaging direction is determined in a manner that the camera images the window 6, and the corners 6b and 6c of the window 6 are symmetrical with respect to the center 6a of a display screen of the HMD. In this state, a position obtained by moving at a predetermined distance from the window 6 is set as a reference position. In addition to the imaging direction and the position, the height of the HMD depending on the height of the experiencing person is registered as the reference point. Although the reference point is registered by each of the experiencing persons 2a, 2b, and 2c, a difference in height between the experiencing persons 2b and 2c may be corrected based on the height of the experiencing person 2. The movement of the experiencing persons 2a, 2b, and 2c after the reference point is registered is detected by the position and direction sensor and recorded as movement history data. Thus, it is possible to represent position data of each experiencing person in a common coordinate system.

Incidentally, the initialization method is not limited to the above method, and may be a method using a GPS sensor or a direction center. Any method may be used as long as the reference point can be shared between experiencing persons in the MR space.

The angles 3a, 3b, and 3c of view that can be imaged by the camera of the HMD are just a part of the real space. In the present system, imaged videos having the imaging angles 3a, 3b, and 3c of view acquired by the HMDs 1a, 1b, and 1c are synthesized to generate a connected real space video (background video). At this time, the position, the direction, and the height of each HMD at the time of imaging are viewpoint-transformed into those of a video imaged at the reference point, and then synthesis is performed. The connection of the background video is repeated every time the experiencing persons 2a, 2b, and 2c move. A portion at which regions overlap each other is updated by a new background video.

FIG. 1B is a view illustrating a state where the background videos are connected. A range 3a (imaging angle of view in FIG. 1A) for imaging by the HMD 1a, a range 3b for imaging by the HMD 1b, and a range 3c for imaging by the HMD 1c are background images at different imaging positions. The videos are viewpoint-transformed into videos imaged at the reference point. Then, the videos are mapped to the 360-degree all-around space centered on the reference point to obtain the connected background video.

The 360-degree all-around space does not mean that all spaces are covered by the imaging ranges 3a, 3b, and 3c. Therefore, the HMDs 1a, 1b, and 1c (experiencing persons 2a, 2b, and 2c) move, and perform imaging in new imaging ranges 3aT, 3bT, and 3cT at the next time T. Videos in the imaging ranges 3aT, 3bT, and 3cT are viewpoint-transformed, and the resultant is added to the connected background video. In this manner, the space of the background video is expanded. When the space is expanded, it is easy to connect by overlapping the feature points, particularly, such as the boundary of the wall, the tangent line between the floor and the wall, and the frame of the window. A portion at which the background videos overlap each other is replaced with a portion of a new background video in time, and the background video is updated.

Incidentally, regarding a connection process of the background video, instead of the imaged video of the HMD, background object data described later may be acquired, and then the background object data may be connected. Further, imaged object data and background object data may be acquired from the video imaged by each HMD, and then, the imaged object data acquired by each HMD may be shared, and the background object data may be connected.

As described above, by performing the connection process of the background videos acquired by the plurality of HMDs (plurality of experiencing persons), it is possible to synthesize the background that cannot be recognized by one HMD (one experiencing person). Specifically, in FIGS. 1A and 1B, it is not possible to capture the sofa 7 at the angle 3b of view of the camera of the experiencing person 2b, and it is not possible to capture the projector 8 at the angle 3c of view of the camera of the experiencing person 2c. However, by connecting camera videos of the experiencing persons and sharing the connected background video with the experiencing persons, the existence of the sofa 7 or the projector 8 is recognized, and the recognized information can be shared by the plurality of experiencing persons 2a, 2b, and 2c, as an imaged object described later.

[MR Display Device]

FIG. 2 is a view illustrating an appearance configuration of the MR display device according to Example 1. The MR display device (HMD) 1 (1a to 1c) includes a camera 10, a distance measurement sensor 11, a position and direction sensor 12, a 3D projector 13, a transmissive screen 14, shutter-attached glasses 15, a controller 16, speakers 17a and 17b, holders 18a and 18b, and a microphone 19. The experiencing person 2 of MR wears the HMD 1 on the head of the experiencing person 2 with the holders 18a and 18b.

The camera 10 is attached to image the front of the head (line-of-sight direction of the experiencing person). The distance measurement sensor 11 measures the distance to a reality object captured by an imaged video of the camera 10. The position and direction sensor 12 is configured by a gyro sensor, a position sensor, a direction sensor, and the like, and detects the position and the line-of-sight direction of the experiencing person.

The distance measurement sensor 11 may measure a distance by two-dimensional irradiation with light beams as in the time-of-flight (TOF) method. The distance measurement sensor may calculate a distance to a feature point such as a contour by using a method like a stereo camera, or may be capable of measuring a distance between the camera and a reality object corresponding to a camera imaged video.

The 3D projector 13 displays a 3D virtual object (AR object) by alternately projecting a video recognized by the left eye and a video recognized by the right eye on the transmissive screen 14. The shutter-attached glasses 15 transmit a video alternately on the left and right in synchronization with the display of the 3D projector. The experiencing person 2 can see the scenery or the reality object in front, through the transmissive screen 14, and can visually recognize the 3D virtual object projected by the 3D projector 13 on the transmissive screen 14 in superimposition on the scenery or the reality object.

The controller 16 takes in the imaged video of the camera 10, distance data of the distance measurement sensor 11, and position and direction data of the position and direction sensor 12, and supplies such types of data to an internal memory and a CPU. The controller creates a video to be projected by the 3D projector 13 or a sound to be output to the speakers 17a and 17b. Further, the controller generates a drive signal of the shutter-attached glasses 15, and synchronizes the drive signal with the video of the AR object projected by the 3D projector 13. The controller switches transmission between the left and right glasses to provide a 3D video for the experiencing person.

The controller 16 includes a user interface with the MR experiencing person 2. When the controller 16 is realized by a device such as a smartphone, a panel having a built-in touch sensor can be used as the user interface.

Figure 3:
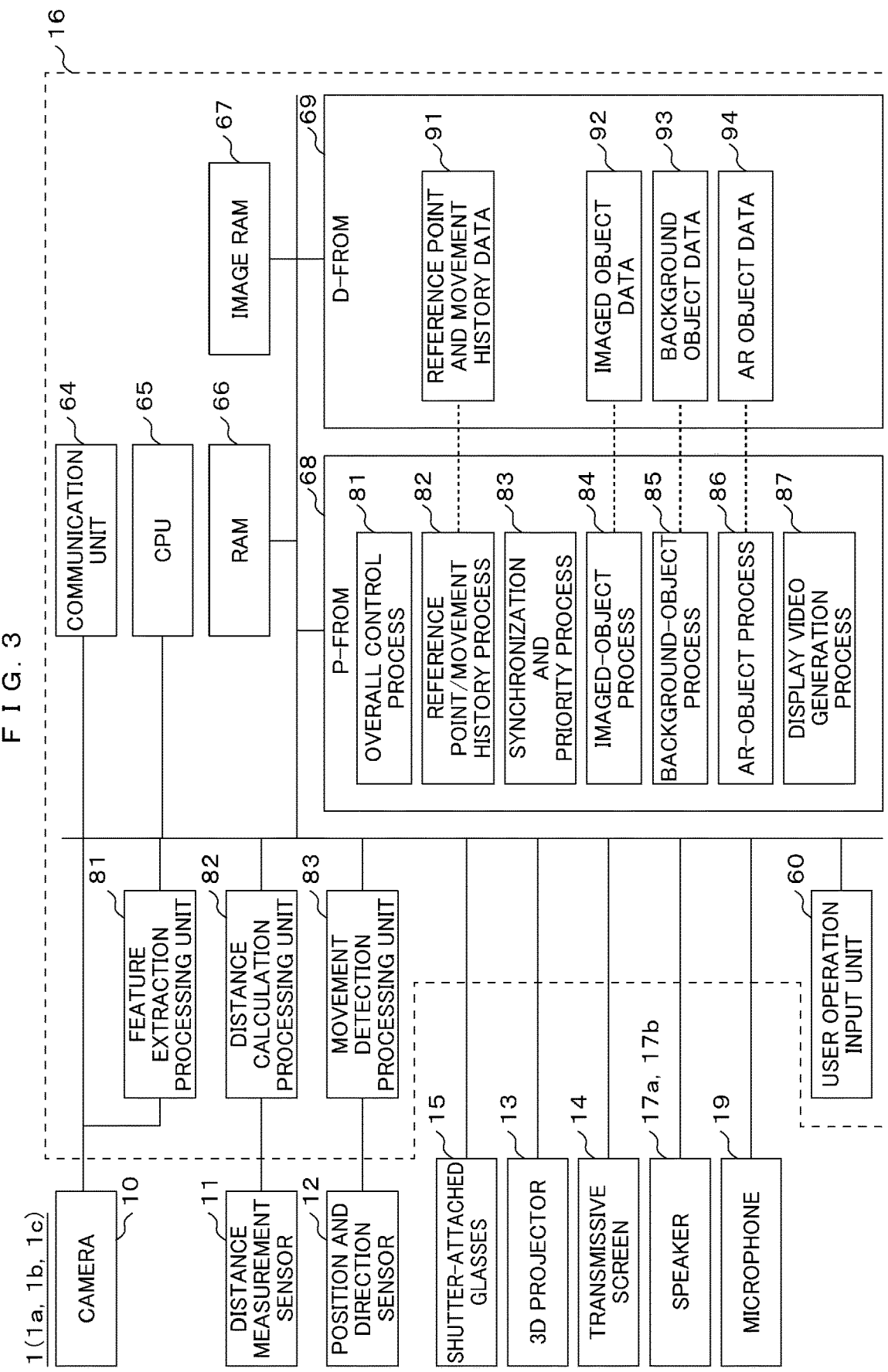
FIG. 3 is a block diagram illustrating a functional configuration of an MR display device 1.

FIG. 3 is a block diagram illustrating a functional configuration of the MR display device 1. The same components as those in FIG. 2 are denoted by the same reference signs. A feature extraction processing unit 61, a distance calculation processing unit 62, a movement detection processing unit 63, a communication unit 64, a CPU 65, a RAM 66, an image RAM 67, a program flash ROM (P-FROM) 68, a data flash ROM (D-FROM) 69, and a user operation input unit 60 are provided inside (indicated by a broken line) the controller 16 of the HMD 1.

The feature extraction processing unit 61 performs a process of extracting a contour (edge) of the reality object from the video imaged by the camera 10, and setting an inflection point or a vertex of the contour as a feature point. The distance calculation processing unit 62 calculates the distance to the feature point based on measurement data of the distance measurement sensor 11. The movement detection processing unit 63 obtains the position and movement amount of the HMD 1 and the imaging direction of the camera 10 based on the measurement data from the position and direction sensor 12. That is, the obtained position and movement amount, and the imaging direction are used as the position and movement amount of the experiencing person 2, and the line-of-sight direction, respectively.

The communication unit 64 connects the HMD 1 to an access point 5 and transmits and receives data to and from another HMD 1. Alternatively, the communication unit can be connected to an external network, and handle a portion of processing of the HMD 1 by a server or the like connected to the external network.

Various processing programs are stored in the program flash ROM 68. The processing programs include an overall control process 81, a reference point/movement history process 82, a synchronization and priority process 83, an imaged-object process 84, a background-object process 85, an AR-object process 86, and a display video generation process 87. The processing programs are expanded into the RAM 66 and executed by the CPU 65.

Pieces of data generated in the process of executing the processing program and from a result obtained by the execution are stored in the data flash ROM 69. Such pieces of data include reference point and movement history data 91, imaged object data 92, background object data 93, and AR object data 94. Thus, when the experiencing person wants to play and experience the MR space, this can be realized by reading out the pieces of stored data.

Incidentally, the program flash ROM 68 and the data flash ROM 69 may be configured by separate memory media as illustrated in FIG. 3, or may be configured by one memory medium. The program flash ROM and the data flash ROM may two or more memory media, or a non-volatile memory medium other than the flash ROM. The data flash ROM 69 may be disposed in a data server on the network.

The video data generated by the display video generation process 87 is stored in the image RAM 67, read from the image RAM 67, and projected by the 3D projector 13. The user operation input unit 60 receives a user input by the touch sensor. The 3D projector 13 projects a control menu video onto the transmissive screen 14 to control the HMD 1.

[MR Space]

Next, an operation of each functional block in the MR display device 1, that is, a process of disposing an AR object in the real space to create the MR space will be specifically described.

Firstly, in the real space illustrated in FIG. 1A, a reality object is recognized and registered as an imaged object or a background object. The room as the real space is surrounded by a front wall 4a, a left side wall 4b, a right side wall 4c, and a floor 4d, and has a window 6, a sofa 7, and a projector 8.

The cameras 10 of the plurality of HMDs 1 image the reality objects. The feature extraction processing unit 61 performs the process of extracting the contours (edges) of the reality objects and setting the inflection points and vertices of the contours as feature points. The set of feature points constituting the contour is transmitted to the CPU 65 to identify what the object is. At this time, the feature extraction processing unit may identify the object by collating with a video database of the external server via the communication unit 64.

The distance measurement sensor 11 and the distance calculation processing unit 62 calculate the distance to each of the objects in the room and create a sketch in the real space. The distance data calculated by the distance calculation processing unit 62 is combined with the feature points extracted by the feature extraction processing unit 61. Further, in the reference point/movement history process 82, the position and direction sensor 12 and the movement detection processing unit 63 record the position (coordinates) and the direction of the HMD 1 when the HMD performs imaging.

The identified reality object is classified into an "imaged object" or a "background object" and registered by the imaged-object process 84 and the background-object process 85. The imaged object has a unique object shape, and the distance data indicates that the imaged objects are located relatively close to each other. Thus, in this example, the window 6, the sofa 7, and the projector 8 are registered. The background object does not have a unique object shape other than a plane, or the distance data includes the farthest point. Thus, in this example, the front wall 4a, the left side wall 4b, the right side wall 4c, and the floor 4d are registered as background objects. That is, the background object is an object that constitutes the background of the camera imaged video.

FIG. 4A is a view illustrating an example of an MR space in which AR objects are disposed in the real space. The same objects as those in the real space illustrated in FIG. 1A are denoted by the same reference signs, and new AR objects 21 to 26 are disposed as virtual objects. Each of the experiencing persons 2a to 2c wearing the HMDs 1a to 1c can experience such an MR space.

Each of the AR objects 21 to 26 is disposed to correspond (that is, linked) the position of a specific reality object (imaged object or background object). The disposition of the AR object is determined by the AR-object process 86 based on the operation of each experiencing person 2. This process is also referred to as a "linking process". That is, in the linking process, the coordinates for disposing each AR object are determined based on the sketch of the real space created from the camera video in FIG. 1B. At this time, in order to not only designate an associated object, but also designate a portion of the object, at which the AR object is disposed, in disposition information (linking information) of the AR object, positioning is performed by giving an offset distance to a specific feature point of the object.

In the case of this example, the TV object 21 is disposed to replace the projector 8 being the imaged object. The table object 22 and the vase object 23 are linked to the sofa 7, and a distance and direction offset is given so that the table object and the vase object are located in front of the sofa 7. The vase object 23 is designated with an offset in the height direction so that a vase is just disposed on a table. The curtain object 24 is linked to the window 6 and is disposed by giving an offset distance to a specific feature point of the window 6. The clock object 25 is linked to the wall 4 being the background object. Any point on the front wall 4a is defined as a pseudo feature point and the clock object is disposed on the pseudo feature point.

The cross object 26 is a 3D object that obtains the effect of covering the background object with a cloth. In this example, the cross object can be applied to a region of the floor 4d portion being the background object, and processing as if a carpet is spread on the floor 4d can be simulated. At this time, the projector 8 replaced by the TV object 21 is also covered with the cross object 26, but, due to the existence of the projector 8, the cross object 26 is raised and wrinkles 26a are formed.

Figure 4B:
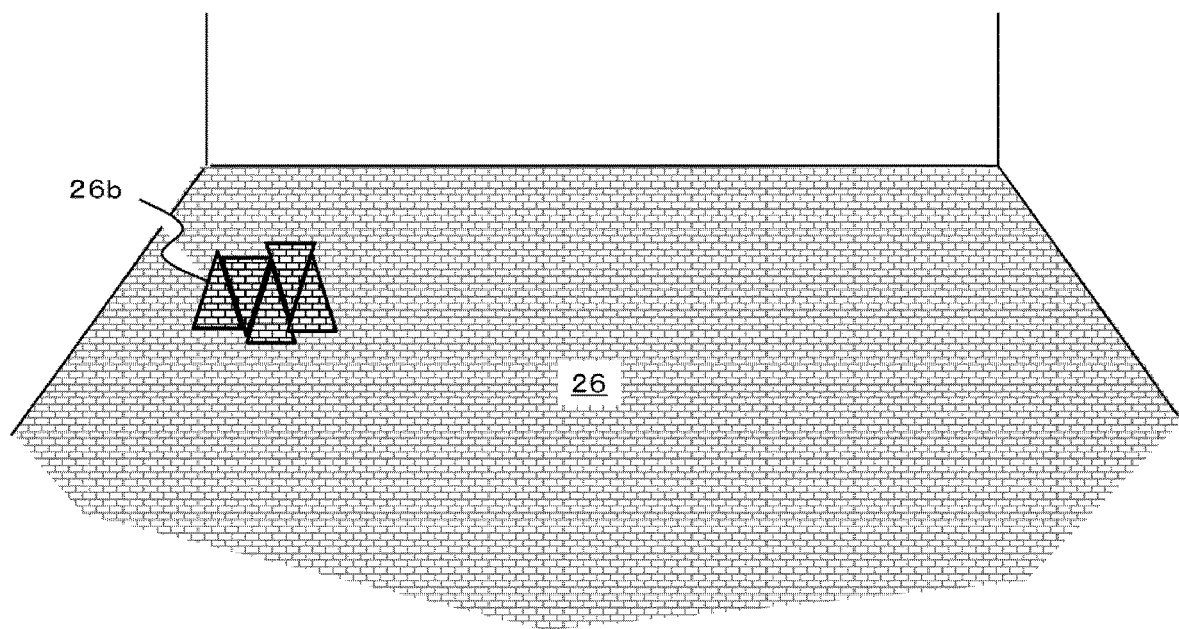
FIG. 4B is a view for describing a generation method of a cross object.

FIG. 4B is a view for describing a generation method of the cross object 26. By using distance information to the projector 8 covered with the cross object 26, a polygon group 26b is disposed at a position in contact with the projector 8 to cover the projector 8. A texture is pasted on the planar region of the floor portion 4d and the polygon group 26b by a rendering technique of 3D computer graphics to generate the cross object 26.

[Process Flow of MR Display Device]

Next, various process flows performed by the MR display device (HMD) 1 will be described. That is, the CPU 65 performs the process in accordance with the following program stored in the program flash ROM 68.

Figure 5:
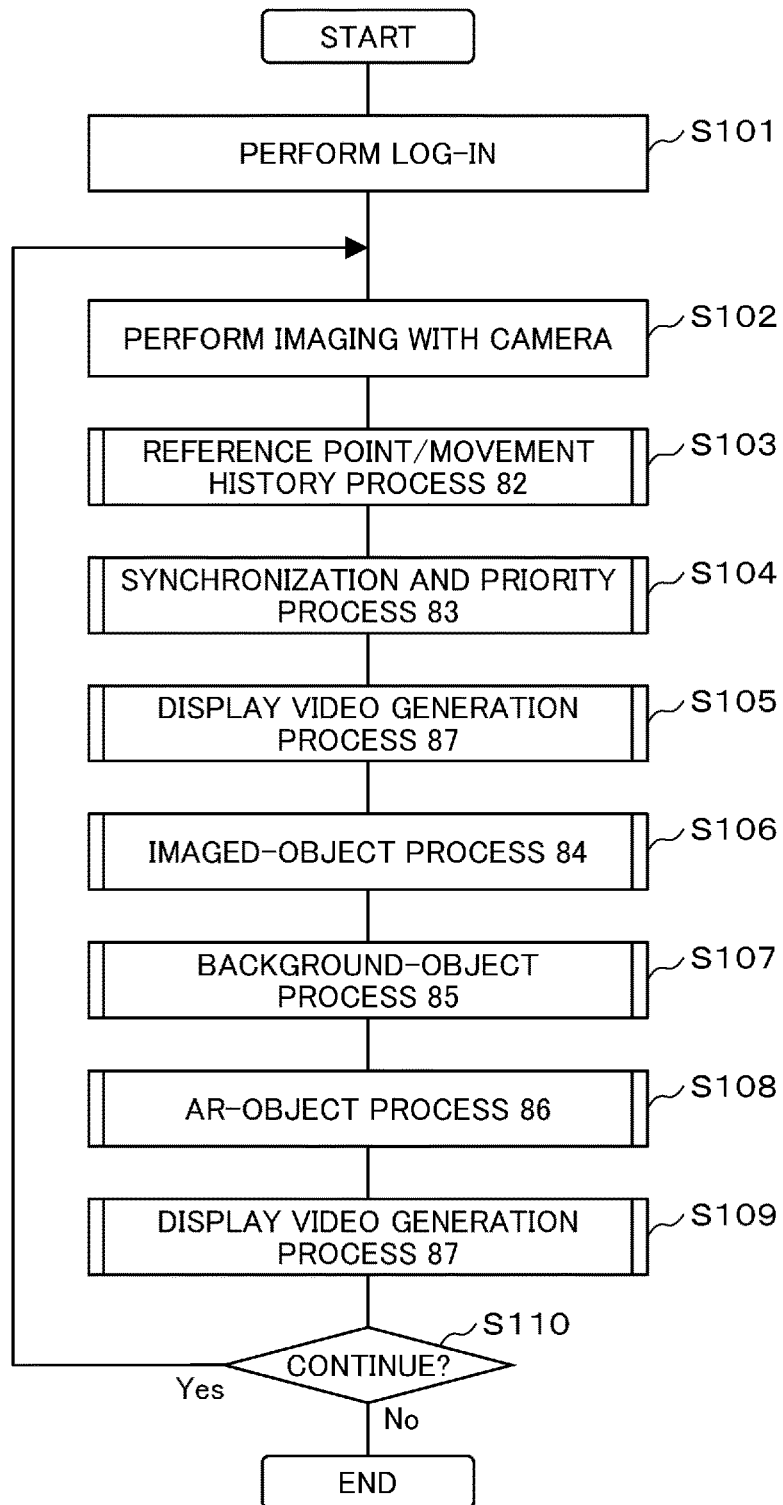
FIG. 5 is a flowchart of an overall control process 81.

FIG. 5 is a flowchart of the overall control process 81. That is, FIG. 5 illustrates the entire process from camera imaging to displaying an AR object in each HMD.

In S101, log-in is performed to participate in an MR experience. A login server may be a personal computer directly connected to the AP 5, or may be a network server connected to the AP 5 via a network.

In S102, the camera 10 starts imaging in the real space. The camera imaging may be performed at a timing at which the entire MR display is performed. For example, an imaged video may be captured at a timing at which the entire MR display is performed by continuing moving imaging of 30 frame per second (fps).

S103 corresponds to the reference point/movement history process 82. In S103, the position, the imaging direction, and the height of the HMD are detected and registered in the reference point and movement history data 91.

S104 corresponds to the synchronization and priority process 83. In this process 83, synchronization of imaged objects, background objects, and AR objects are performed between a plurality of HMDs participating in the MR experience, and a process of a priority set in each of the imaged objects and the background objects is performed, and thus the data is updated to the latest state. The priority means assignment of an operation authority for a specific object to a specific HMD (experiencing person). When the priority is set, it is not possible for other experiencing persons to edit the object.

S105 corresponds to a process 87 of display video generation. The MR experiencing person wearing the HMD performs the imaged-object process 84 of S106, the background-video process 85 of S107, and the AR-object process 86 of S108 as follows, while confirming a display video in a state where each of the imaged object and the background object, and the priority are updated latest.

In the imaged-object process 84 of S106, feature extraction of the captured camera imaged video is performed. A feature point is selected, what is the reality object is identified from the set of the feature points, and the identified object is registered as the imaged object in the imaged object data 92.

In the background-object process 85 of S107, a feature point at the farthest point in the distance data given to the feature point is included. A region other than the imaged object is registered as the background object in the background object data 93.

In the AR-object process 86 of S108, an AR object disposed on the imaged object or the background object is selected (added), and parameters (display parameters) when the AR object is disposed are edited. This process includes an operation of downloading AR object data from the network and causing the experiencing person to select the AR object. The data of the selected AR object is registered in the AR object data 94. The display parameters are registered as liking data in the imaged object data 92 and the background object data 93.

S109 corresponds to the display video generation process 87. In S109, a display video of the AR object added or edited in S108 is generated, and the MR experiencing person visually recognizes the display video with the HMD.

It is determined in S110 whether to continue. In the case of continuing (Yes), the process returns to S102. In the case of not continuing (No), the process is ended.

As described above, in this example, the plurality of HMDs 1 worn by the plurality of experiencing persons 2 can be connected to each other, and pieces of data of the imaged object and the background object acquired by each HMD and the virtual object (AR object) linked to the imaged object or the background object can be synchronized with each other and shared. As a result, it is possible to share the same real space between a plurality of experiencing persons, and each of the experiencing persons can individually perform an operation of, for example, displaying the virtual object in the real space or replacing the virtual object.

Each of the processes will be described below in detail.

Figure 6:
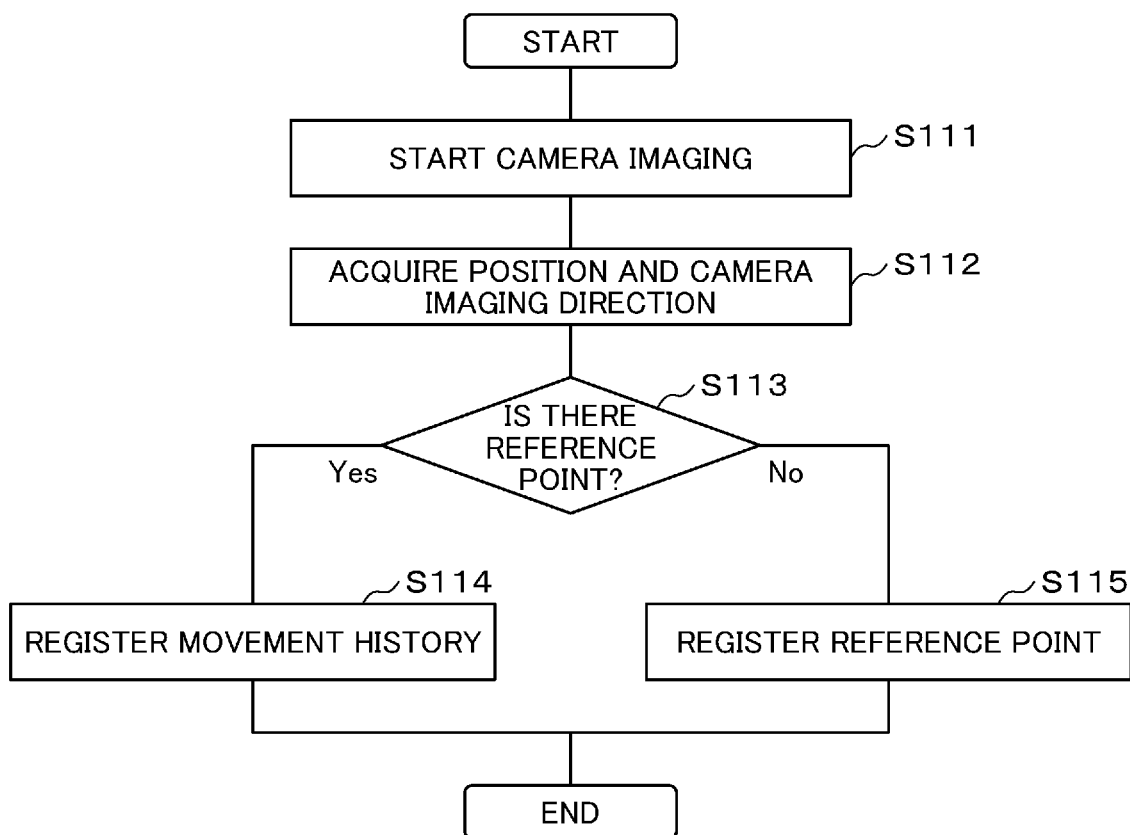
FIG. 6 is a flowchart of a reference point/movement history process 82.

FIG. 6 is a flowchart of the reference point/movement history process 82. This process is performed by the position and direction sensor 12 and the movement detection processing unit 63.

In S111, the MR experiencing person 2 wears the HMD 1 and starts camera imaging.

In S112, the position and direction sensor 12 detects the position of the HMD 1 and the imaging direction of the camera 10, and acquires the data representing the position, the height, and the line-of-sight direction of the experiencing person.

In S113, it is confirmed whether reference point data is already registered in the reference point and movement history data 91 in the data flash ROM 69, that is, whether or not the MR experience is started.

When the reference point data is registered (Yes), the reference point data is registered as movement history data in S114. When the reference point data is not registered (No), the reference point data is registered as the reference point data in S115. The movement history data is represented by a difference from the reference point data.

After that, each time a user performs camera imaging while moving in the real space, the pair of the current position and the camera imaging direction is registered as movement history in the reference point and movement history data 91.

Figure 7:
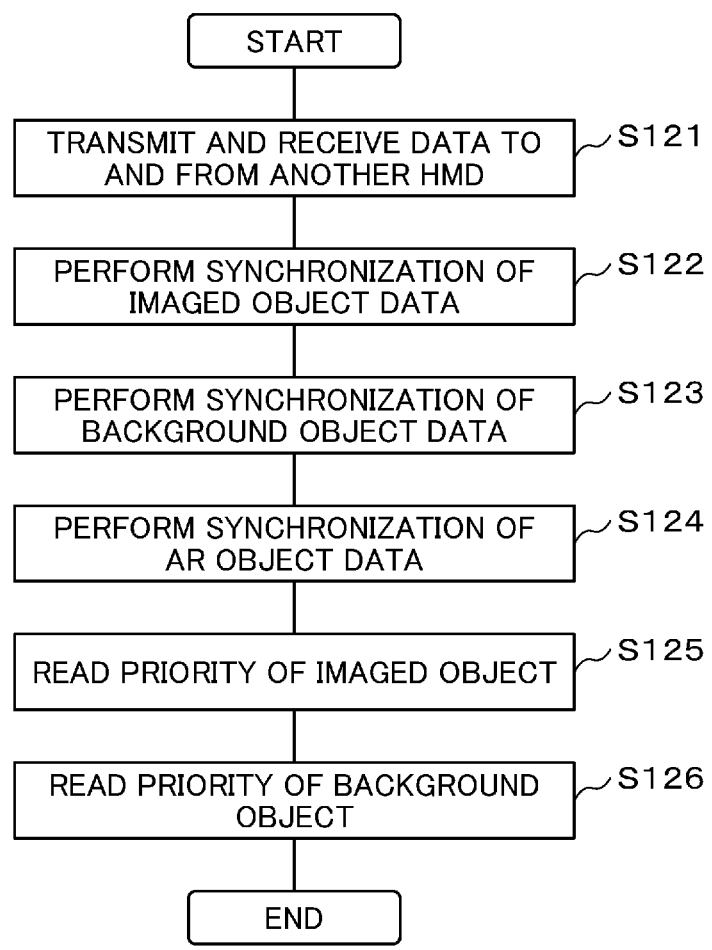
FIG. 7 is a flowchart of a synchronization and priority process 83.

FIG. 7 is a flowchart of the synchronization and priority process 83.

Firstly, the synchronization process is a process of sharing and latest updating the data of the imaged object, the background object, and the AR object possessed by the plurality of HMDs 1, between the plurality of HMDs 1.

In S121, each of the HMDs transmits and receives data to and from another HMD via the communication unit 64, and stores the acquired data in the data flash ROM 69.

In S122, synchronization for the imaged object data is performed.

In S123, synchronization for the background object data is performed.

In S124, synchronization for the AR object data is performed.

Next, the priority process is a process of reading the priority assigned to the imaged object or the background object. It is not possible for a person other than the set MR experiencing person to edit the object for which the priority has been set (link the AR object).

In S125, priority setting for the imaged object is read.

In S126, the priority setting for the background object is read.

Priority setting information is used as a reference in the linking process of the AR object (S108).

FIG. 8 is a flowchart of the imaged-object process 84. This process is performed by the feature extraction processing unit 61.

In S131, the imaged video is read out from the camera 10.

In S132, the feature analysis of the video is performed. For example, an edge is extracted, and the vertex and the inflection point of the edge are extracted as feature points.

In S133, the distance data acquired by the distance measurement sensor 11 and the distance calculation processing unit 62 is added to the feature points.

In S134, a difference from the previous feature point is evaluated.

In S135, the type of the object and the like are identified from the set of feature points between which a difference is evaluated to be significant. At this time, the object can be identified by collating with the video database of the external server via the communication unit 64.

In S136, the result of the identification is registered as the imaged object in the imaged object data 92.

In S137, when the identified imaged objects include a person, the result of the identification is transmitted to the display video generation process 87. This is because there is a high possibility that the camera is imaging another MR experiencing person. When the other MR experiencing person determines that the MR video is not necessary, identification information of the person object is transmitted to the display video generation process 87, and exclusion of the person object from the display video is requested. Alternatively, the experiencing person himself/herself may determine, from the camera imaged video in S131, that the identified imaged object indicates the other MR experiencing person, exclude the person object from the display video.

FIG. 9 is a flowchart of the background-object process 85.

In S141, among the feature points extracted by the feature extraction processing unit 61, the feature point having the farthest distance is selected. In the example of FIG. 1A, the corner of the front wall 4a and the like correspond to the feature point having the farthest distance. A region that includes the feature point having the farthest distance and is not recognized as the imaged object is selected and set as a region A.

In S142, among the feature points extracted by the feature extraction processing unit 61, a region in which distance detection is not possible (exceeding the detection limit) is selected and set as designated as a region B.

In S143, the region A and the region B selected in the above processes are used as background objects in the real space.

In S144, difference data from the registered background object data is calculated.

In S145, the background object data acquired from another HMD is synchronized.

In S146, pieces of the background object data synchronized with the above difference data is integrated.

In S147, the background object is divided into some regions as necessary.

In S148, AR objects are disposed in the divided regions. For example, as illustrated in FIGS. 4A and 4B, the cross object 26 can be pasted to the floor 4d.

In S149, background data obtained by the integration and the region data obtained by the division are registered as background objects in the background object data 93.

Figure 10A:
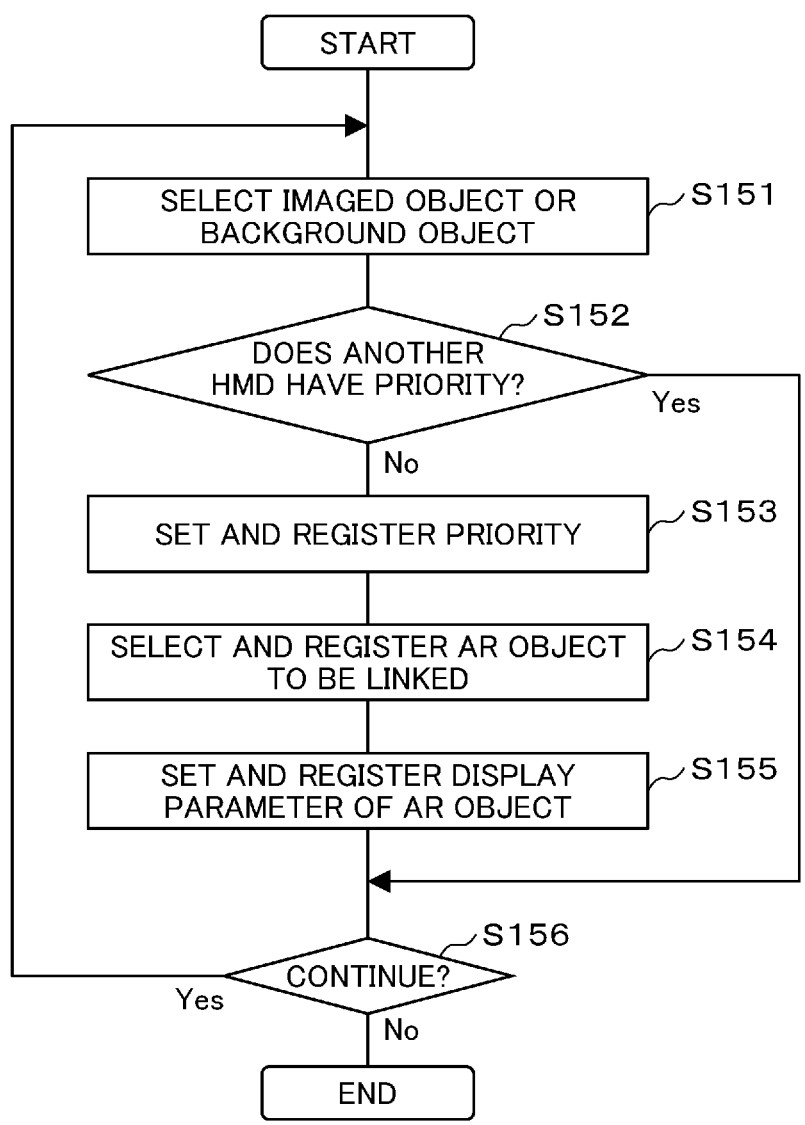
FIG. 10A is a flowchart (case 1) of an AR-object process 86.
Figure 10B:
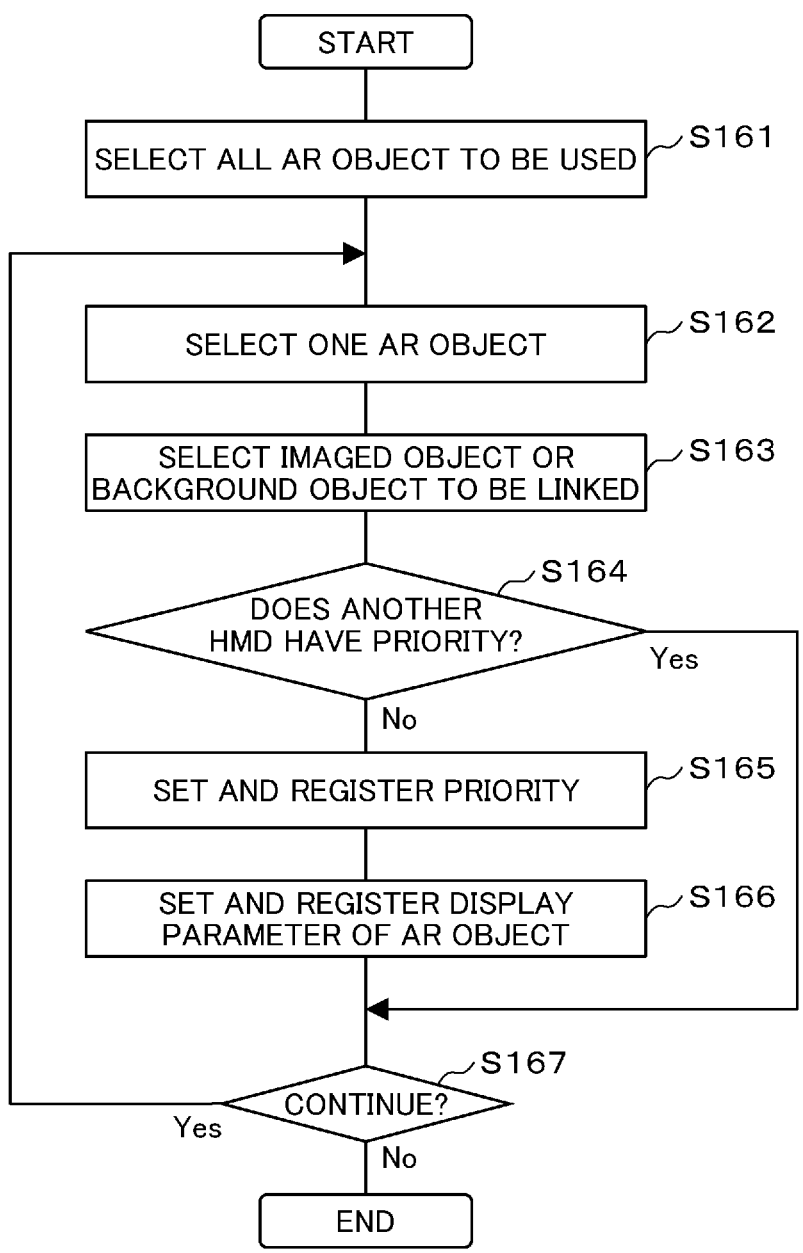
FIG. 10B is a flowchart (case 2) of the AR-object process 86.

FIGS. 10A and 10B are flowcharts of the AR-object process 86. A portion of the process procedure is changed in FIGS. 10A and 10B. Either flow may be used. This process is performed interactively while the experiencing person looks at an operation screen.

A case (case 1) of FIG. 10A will be described.

In S151, one object on which the AR object is disposed is selected from the imaged object or the background object (which may be the divided region).

In S152, it is confirmed whether a priority is set for the selected object by another HMD. For the confirmation, the result of reading the priority in the synchronization and priority process 83 (FIGS. 7, S125, and S126) is used as the reference. When the priority is set (Yes), the process proceeds to S156. When the priority is not set (No), the process proceeds to S153.

In S153, priority setting registration is performed for the selected object. Thus, editing (linking the AR object) the object selected in preference to other HMDs can be performed. In the case of the background object, there are a priority assigned to the AR object linked to the entirety of the background object and a priority assigned to each region obtained by dividing the background object.

Figure 12A:
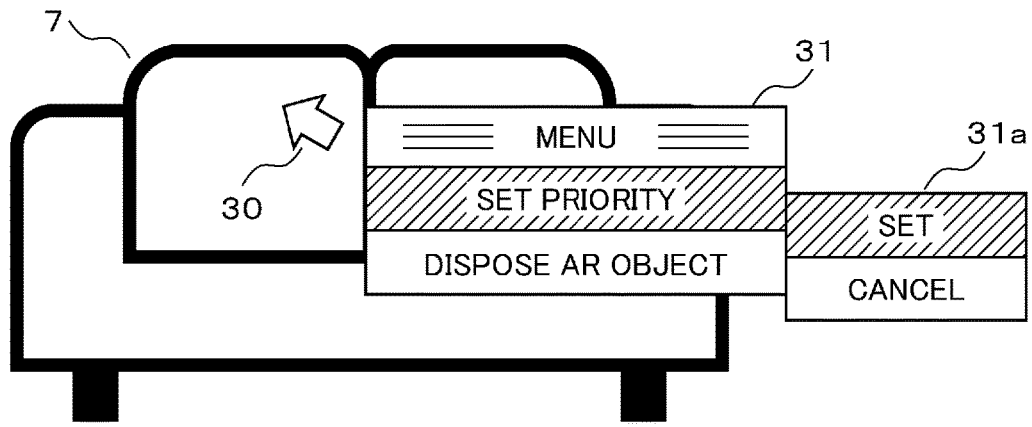
FIG. 12A illustrates an operation screen for setting a priority to an imaged object.

The registered priority can be canceled. The priority is canceled in a manner that a cancellation request (for example, voice call by the microphone 19) of another experiencing person is received, and the experiencing person holding the priority changes the setting. Alternatively, the set experiencing person may cancel the priority. The priority may be automatically lost when linking of the AR object is canceled (deleted). FIG. 12A illustrates a specific setting screen.

In S154, an AR object linked to the selected object is selected. The AR object selection candidate may be prepared in advance in the HMD 1, or may refer to data accumulated in the external server via the communication unit 64. The selected AR object is registered in the AR object data 94.

Figure 12B:
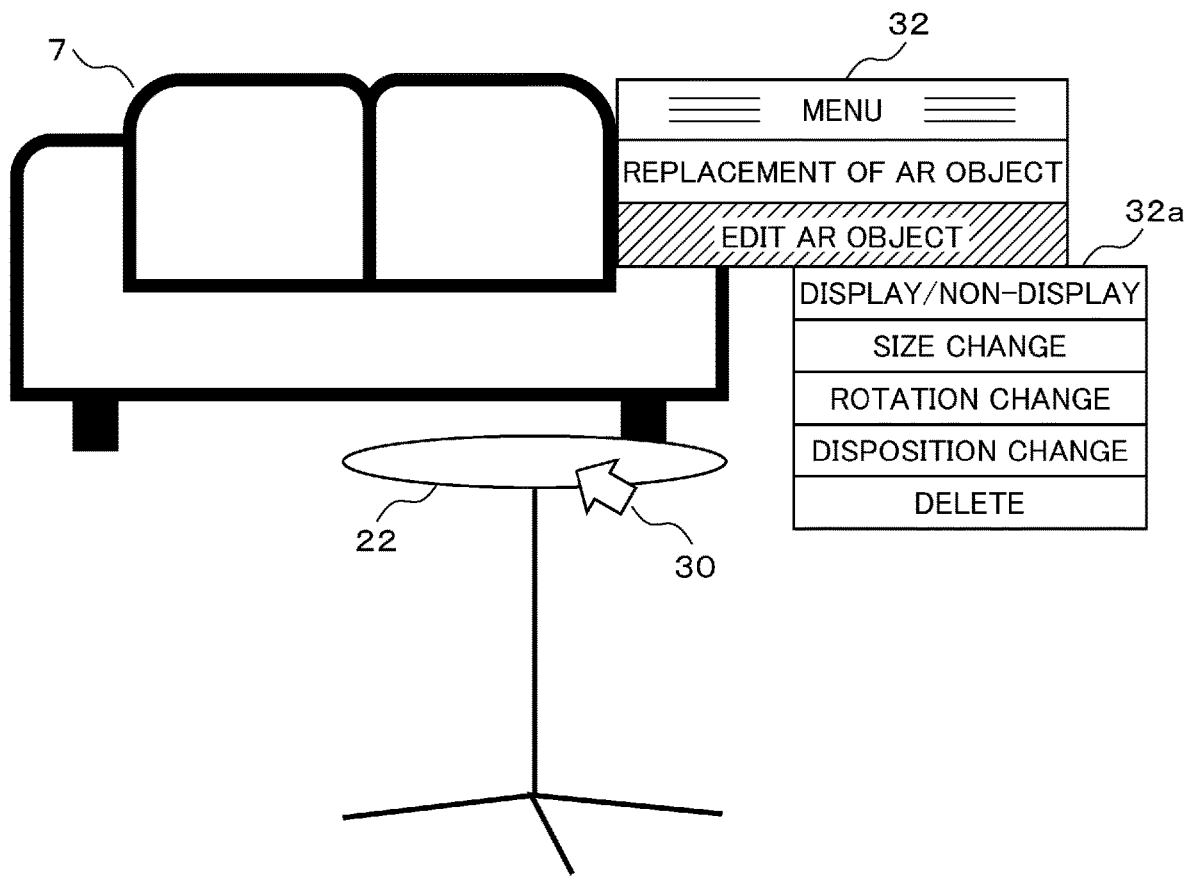
FIG. 12B illustrates an operation screen for editing a linked AR object.

In S155, the display parameters when the AR object is displayed are set. Thus, the display position, the size, and the direction of the AR object with respect to the object are given. That is, positioning with respect to the object can be performed by giving an offset to the position of a certain feature point of the selected object. In a background object having a feature point which is not clear, such as the region B, any point in the region may be selected and the selected point may be used as a pseudo feature point. The set display parameter is registered as linking data of the AR object in the imaged object data 92 or the background object data 93. FIG. 12B illustrates a specific AR object edit screen.

In S156, it is determined whether or not the imaged object or the background object on which the AR object is disposed remains. When the imaged object or the background object remains (Yes), the process returns to S151. When the imaged object or the background object does not remain (No), the process ends.

Next, a case (case 2) of FIG. 10B will be described. In this case, a procedure of first selecting an AR object, and assigning the imaged object or the background object to the selected AR object is performed.

In S161, all AR objects to be used are selected. For the selection, the component built in the HMD 1 or the external server is used for the reference. The selected AR object is registered in the AR object data 94.

In S162, one of the selected AR objects is selected.

In S163, the imaged object or the background object to which the selected AR object is linked is selected.

In S164, it is confirmed whether a priority is set for the selected object by another HMD. For the confirmation, the result of reading the priority in the synchronization and priority process 83 (FIGS. 7, S125, and S126) is used as the reference. When the priority is set (Yes), the process proceeds to S167. When the priority is not set (No), the process proceeds to S165.

In S165, priority setting registration is performed for the selected object. Thus, the object selected in preference to other HMDs can be edited.

In S166, display parameters (position, size, direction on the display) when the AR object is displayed are set. The set display parameter is registered as linking data of the AR object in the imaged object data 92 or the background object data 93.

In S167, it is determined whether or not the AR object selected in S161 remains. When the AR object selected in S161 remains (Yes), the process returns to S162. When the AR object selected in S161 does not remains (No), the process ends.

Figure 11:
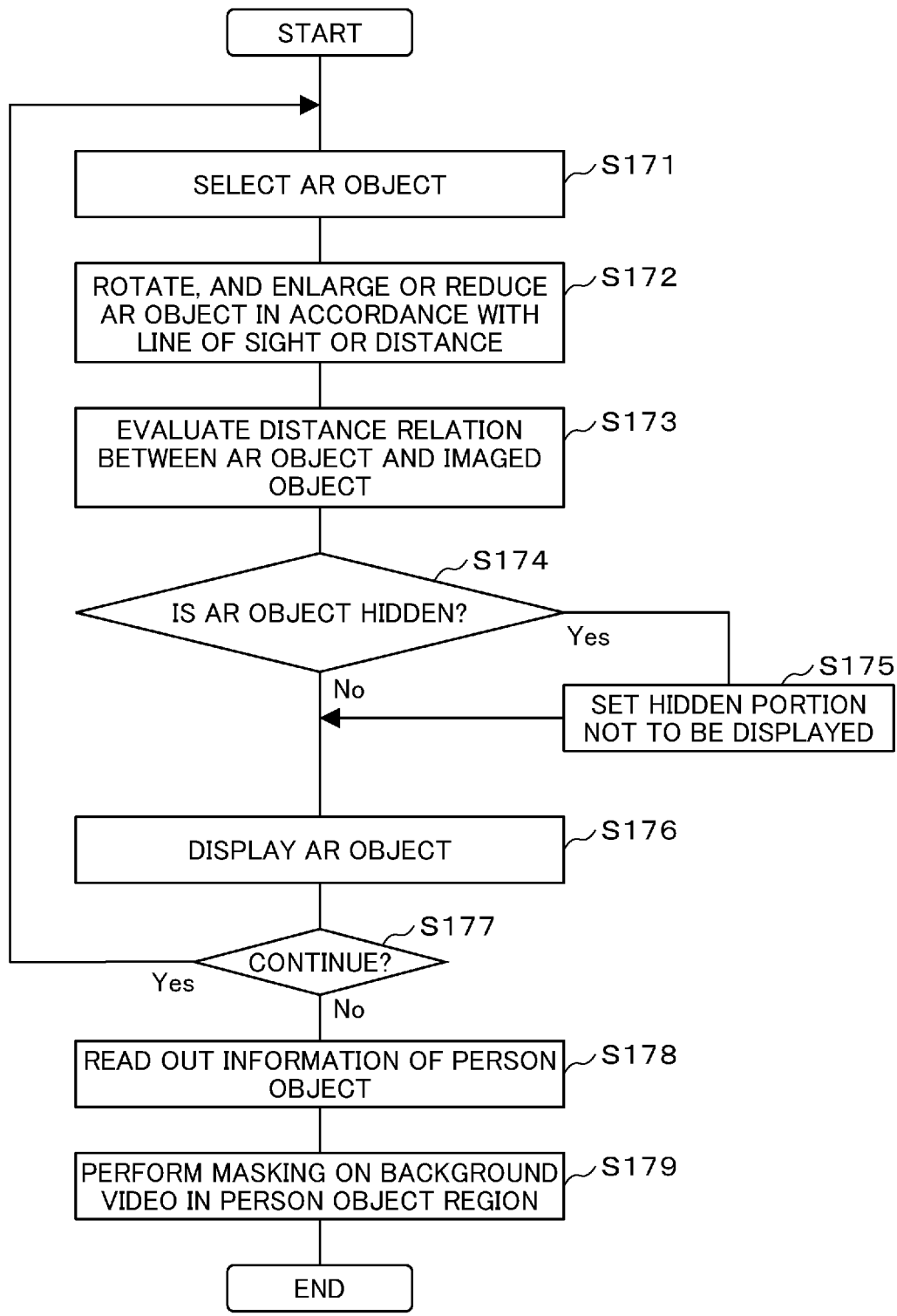
FIG. 11 is a flowchart of a display video generation process 87.

FIG. 11 is a flowchart of the display video generation process 87. Here, various types of data registered in the data flash ROM 69 are read out to generate a display video of the AR object, and the display video is projected and displayed by the 3D projector 13.

In S171, the AR object to be displayed is selected with reference to the imaged object data 92, the background object data 93, and the AR object data 94.

In S172, the AR object is rotated in accordance with the direction (line of sight of the user) of the HMD 1. The AR object is enlarged or reduced in accordance with the distance to the imaged object (or background object) to be linked.

In S173, a distance relation (far and close) between the AR object and the reality object (imaged object) that overlaps the AR object in the line-of-sight direction is evaluated. The distance to the reality object is measured by the distance measurement sensor 11.

In S174, it is determined whether or not the AR object is hidden by the reality object, that is, whether or not the reality object is in front of the AR object. When the AR object is hidden (Yes), the process proceeds to S175. When the AR object is not hidden (No), the process proceeds to S176.

In S175, the hidden portion or the entire video of the AR object is set not to be displayed (for example, the image data is rewritten to 0).

In S176, the 3D projector 13 projects and displays the AR object.

In S177, when there is an unprocessed AR object (Yes), the process returns to S171 and the next AR object is processed. When there is no unprocessed AR object (No), the process proceeds to S178.

In S178, the information of the person object in the imaged object is read out. The information of the person object is the information transmitted in the imaged-object process 84 (S137) and is temporarily stored.

In S179, a person is covered (masking) in a manner that a background video is cut out from the region of the background object that matches a person display region, based on the person object information, and the cut-out background video is displayed in front of the person (position closer to the HMD). Thus, an occurrence of a situation in which another MR experiencing person appears in the display video is prevented.

[Setting of Priority and AR Object]

Next, an example of a user operation screen in the AR-object process 86 described with reference to FIG. 10A (FIG. 10B) will be described.

FIG. 12A illustrates an operation screen for setting (S153 and S165) the priority for the imaged object. Here, the sofa 7 as the reality object is recognized as the imaged object, and the priority is set for the imaged object. In this setting operation, a cursor 30 is first placed on the sofa 7 and clicked. With this operation, a small menu screen 31 pops up. "Set priority" is clicked from a list presented on the small menu screen 31. The clicked item is converted to outline characters on a black background. This state is illustrated in FIG. 12A. In response to this, a priority setting screen 31a appears. The experiencing person selects "set" or "cancel" of the priority with the cursor 30, and makes a desired setting for the sofa 7.

FIG. 12B illustrates an operation screen for editing (S155 and S166) the linked AR object. Here, a case where the setting of various display parameters is changed for the table object 22 linked to the sofa 7 is illustrated. The cursor 30 is placed on the table object 22 and clicked. With this operation, a menu small screen 32 is popped up. When "edit AR object" is clicked, an edit screen 32a appears. Here, edit operations such as switching "display/non-display", changing "display size", changing "display rotation", and changing "display disposition" are performed. Further, when "delete" of the AR object is selected, the linked table object 22 is deleted. At this time, when the table object 22 is linked to the sofa 7, the priority set on the sofa 7 may also be canceled.

[Data Table]

FIGS. 13A to 13E are views illustrating examples of various data tables stored in the data flash ROM 69.

FIG. 13A illustrates header data. "Content ID" at the top of the table is an ID common to tables of an imaged object, a background object, and an AR object, which will be described later, and the like. "Content type" indicates that the data is header data. "Content name" indicates that the data is related to the MR experience. A list of data handled by the HMD 1 is described in "accompanying content". In addition, information such as "content holder" and "copyright" is contained.

FIG. 13B illustrates the reference point and movement history data 91. The common "content ID" is provided, and "content type" indicates that the data is reference point and movement history data. As the data, time (T0, T1, T2) and the position and direction of "reference point (PBase)" and "movement history (MP1, MP2)" are described. The time is the camera imaging time in MR processing, and is described in coordinated universal time (UTC). Regarding the position and direction, the position (including the height) of the MR display device 1 and the imaging direction at each time are indicated by difference data starting from the reference point (PBase). For example, the movement history (MP1) at time T1 is represented by the difference position (r1, θ1, φ)= (distance, horizontal angle, vertical angle) and the difference direction (θθ1, φφ1)=(horizontal angle, vertical angle).

In this example, the reference point values are given as the position=(0, 0, 0) and the direction=(0, 0). The value of GPS data value may be given at the position other than the height, and the value of the azimuth angle may be given at the direction.

FIG. 13C illustrates the imaged object data 92. The imaged object data is described separately for each imaging position as the reference position (PBase) and the movement position (MP1, . . . ). The imaged object data is synchronized, and the result obtained by integrating pieces of data of a plurality of HMDs is described.

A serial number, for example, "imaged object 1", "imaged object 2", or the like is given to the imaged object recognized at each imaging position, and the name being the name of the recognized object, such as "window", "projector", and "sofa" is described. Extracted "feature point 1", "feature point 2", and the like, and data of "linked AR object", and a priority flag indicating a priority setting status are described in each imaged object.

The data of each feature point includes a relative position (distance and direction) with respect to the imaging position of the HMD 1. The data of "linked AR object" is linked to the AR object data 94 described later, and the AR object (title) designated by the data ID is linked. Further, "linking position" indicates the feature point and the offset distance at which the AR object is disposed. "Size" and "rotation" are parameters when the AR object is displayed.

In this example, when the imaging position is the reference position (PBase), the imaged objects 1 to 3 are described. The AR object 1 is linked to the imaged object 1 (window). The AR object 2 is linked to the imaged object 2 (projector). The AR object 3 is linked to the imaged object 3 (sofa).

Further, even when the imaging position is the movement position (MP1, . . . ), similar description will be made. The numerical values of the positions and directions of the imaged objects 1 and 2 with respect to each feature point are slightly different depending on whether the imaging position is the reference position (PBase) or the movement position (MP1). This is because, even though the imaged objects 1 and 2 do not move in the real space, the values differ depending on the movement of the HMD 1. In addition, when a new imaged object is recognized at the movement position, this is added to the table.

Further, the priority flag indicating the priority setting status is assigned to each imaged object. The priority flag is configured by a plurality of digits. The first digit is "1" when the priority is set by the person who images the object (data provider). The remaining digits represent the MR experiencing persons who hold the priority. A relation between the digit value and the MR experiencing person is given at the time of log-in. The priority is set when a certain MR experiencing person links an AR object with the imaged object and does not want another MR experiencing person to change the linked AR object.

FIG. 13D illustrates the background object data 93. The background object data is classified for each imaging position, and is described separately as a reference position (PBase) and a movement position (MP1, . . . ). The background object data is also synchronized, and this is the result obtained by integrating pieces of the background object data of a plurality of HMDs.

In the case of the feature point, "feature point 1", "feature point 2", and the like are described in the background object data. The feature points may include pseudo feature points instructed by the experiencing person. Subsequently, as in the case of the imaged object, "linked AR object" is described, and the data ID of the linked AR object and the priority flag are included in "linked AR object". The background object data has bitmap data corresponding to the coordinates of a virtual video of the 360° camera centered on the reference point so that the position and the shape can be grasped.

Further, when the background object is divided into regions, the background object data includes divided region data. The divided region data includes region division information such as feature points, priority information, and 3D image data of a cross object covering the divided region.

FIG. 13E illustrates the AR object data 94. The AR object data is, for example, data downloaded from a server on the network, and a serial number is assigned to each AR object. A data ID for identification is assigned to each AR object data. With the data ID, the AR object data is linked to the imaged object data or the background object data described above. The title and the description of copyright are provided as items, and 3D image data is stored. A display video is generated by using the 3D image data.

As described above, according to Example 1, the plurality of MR display devices worn by the plurality of experiencing persons can be connected to each other, and pieces of data of the imaged object and the background object acquired by each device and the virtual object (AR object) linked to the imaged object or the background object can be transmitted and received to and from each other and shared. As a result, it is possible to share the same real space between a plurality of experiencing persons, and each of the experiencing persons can individually perform an operation of, for example, displaying the virtual object in the real space or replacing the virtual object.

In addition, in the process of linking a virtual object to an imaged object or a background object, a priority for assigning an operation authority for a specific object to a specific HMD (experiencing person) is set. Thus, for example, it is possible to smoothly and efficiently perform the collaborative operation in the same space by a plurality of operators, by sharing the space.

Example 2

In Example 2, a case where an AR object is configured by a plurality of components, and a priority is set for each component will be described.

[MR Space]

Figure 14:
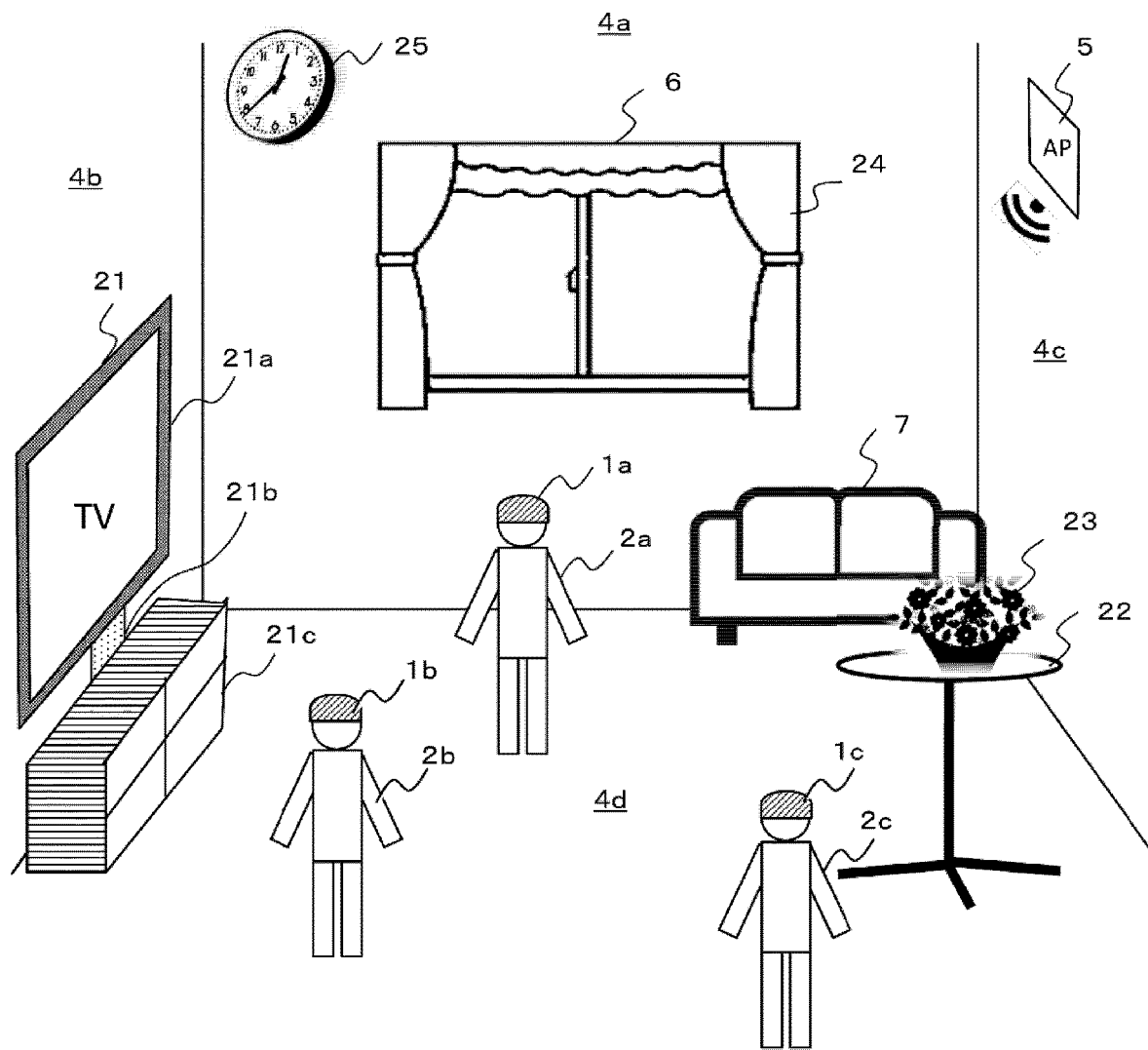
FIG. 14 is a view illustrating an example of an MR space according to Example 2.

FIG. 14 is a view illustrating an example of an MR space according to Example 2. The same elements as those in the MR space illustrated in FIG. 4A in Example 1 are denoted by the same reference signs, and repetitive description will be omitted. The difference from the MR space in FIG. 4A is that the projector 8 is removed, there is no cross object 26, and the TV object 21 being the AR object is configured by three components 21a, 21b, and 21c. Here, 21a indicates a flat panel, 21b indicates a support, and 21c indicates a pedestal. The colors and forms of the three components can be individually selected, and the different MR experiencing person can set the color and form for each component.

Figure 15:
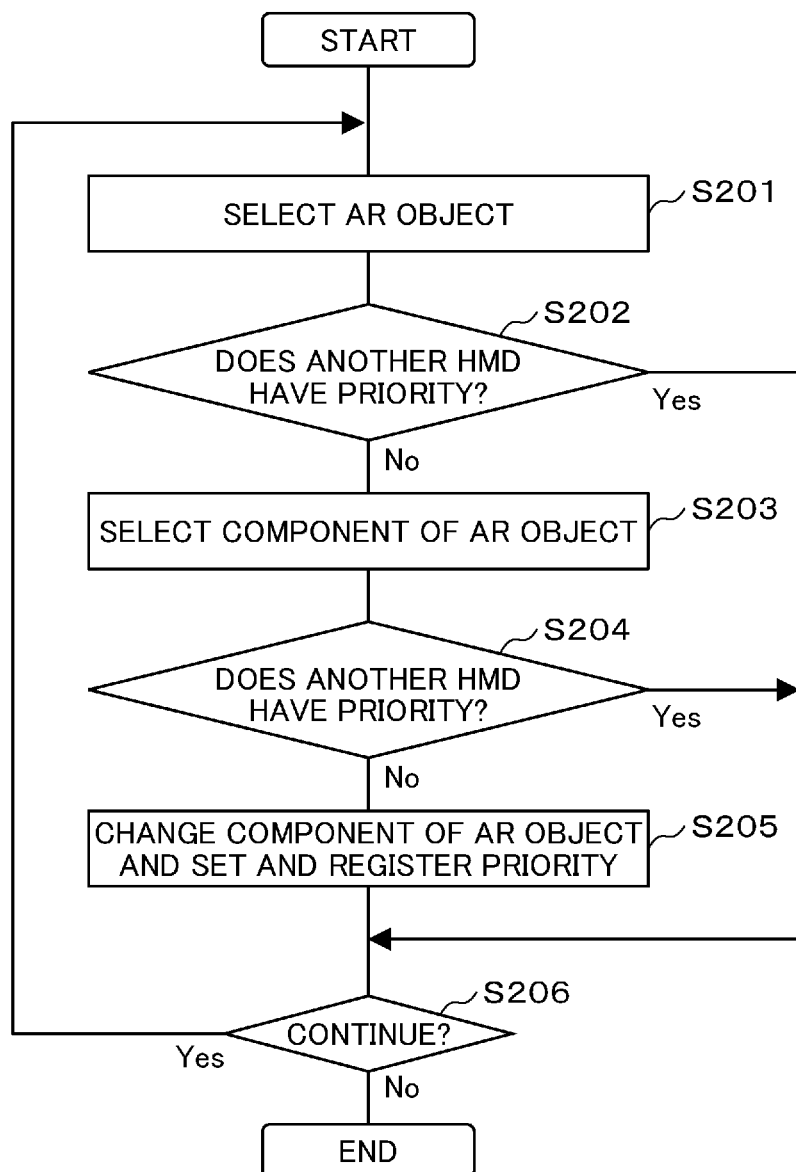
FIG. 15 is a flowchart (additional portion) of the AR-object process 86.

FIG. 15 illustrates a flowchart of AR-object process 86 (additional portion) in Example 2. Here, it is assumed that AN AR object is already linked by the flow of FIG. 10A or FIG. 10B in Example 1. This is a process when the linked AR object is configured by a plurality of components and some components are edited (changed).

In S201, one AR object is selected.

In S202, it is confirmed whether the priority is set on an imaged object or a background object to which the selected AR object is linked, from another HMD. When the priority is set (Yes), the priority extends to the entirety of the AR object, and the process proceeds to S206. When the priority is not set (No), the process proceeds to S203.

In S203, the component of the AR object, which is to be changed, is selected.

In S204, it is confirmed whether the priority is set on the selected component of the AR object, from another HMD. When the priority is set (Yes), the process proceeds to S206. When the priority is not set (No), the process proceeds to S205.

In S205, the component of the AR object is edited (changed). The priority is set, and the registration in a data table is performed.

In S206, it is determined whether or not there is an AR object having a component which is intended to be changed. When there is such an AR object (Yes), the process returns to S201. When there is no AR object (No), the process ends.

FIGS. 16A and 16B are examples of data tables according to Example 2. FIG. 16A illustrates a data table of imaged object data, and FIG. 16B illustrates a data table of AR object data.

Describing the difference from Example 1, an AR object 2 linked to the projector being the imaged object 2 in FIG. 16A is configured by a plurality of components 1 to 3. For each component, a subdivision of data ID is described. The priority flag indicating an edit authority is assigned to each component by the different MR experiencing person.

In the AR object data in FIG. 16B, in the corresponding column of the AR object 2, pieces of 3D image data of the three components being the panel, the support, and the pedestal, which correspond to the components 1 to 3 are stored.

As described above, according to Example 2, it is possible to obtain the similar effects to those in Example 1, and to configure the AR object with a plurality of components and set a different priority for each component. As a result, it is possible to edit one AR object by a plurality of MR experiencing persons and to express various combinations of MR spaces.

Example 3

In Example 3, a configuration (MR network system below) in which a plurality of MR display devices (HMDs)

are connected to a network and MR processing performed by each of the HMDs is performed by a server connected to the network will be described.

[MR Network System]

FIG. 17 is a diagram illustrating a configuration of an MR network system according to Example 3. A plurality of MR display devices (HMDs) 1a, 1b, and 1c can be worn by MR experiencing persons 2a, 2b, and 2c, respectively. Each of the HMDs 1a, 1b, and 1c can be connected to a network 51 via an access point (AP) 5 such as a wireless LAN and a gateway 50, and thus transmission and reception of data can be performed between the experiencing persons.

An application server 52 and a data storage server 53 are connected to the network 51. The application server 52 includes an MR processing application for synthesizing imaged videos of a plurality of experiencing persons and disposing AR objects. The data storage server 53 can store data of an AR object and an imaged object, synthesized indoor video data, position information when the AR object is disposed, and the like. Each of the experiencing person can read out the pieces of data.

Therefore, the internal configuration of each of the HMDs 1a, 1b, and 1c can be obtained by omitting or simplifying the processing programs 81 to 87 stored in the program flash ROM 68 or the data tables 91 to 94 stored in the data flash ROM 69 in the functional block illustrated in FIG. 3 in Example 1.

[Sequence of MR Network System]

Figure 18B:
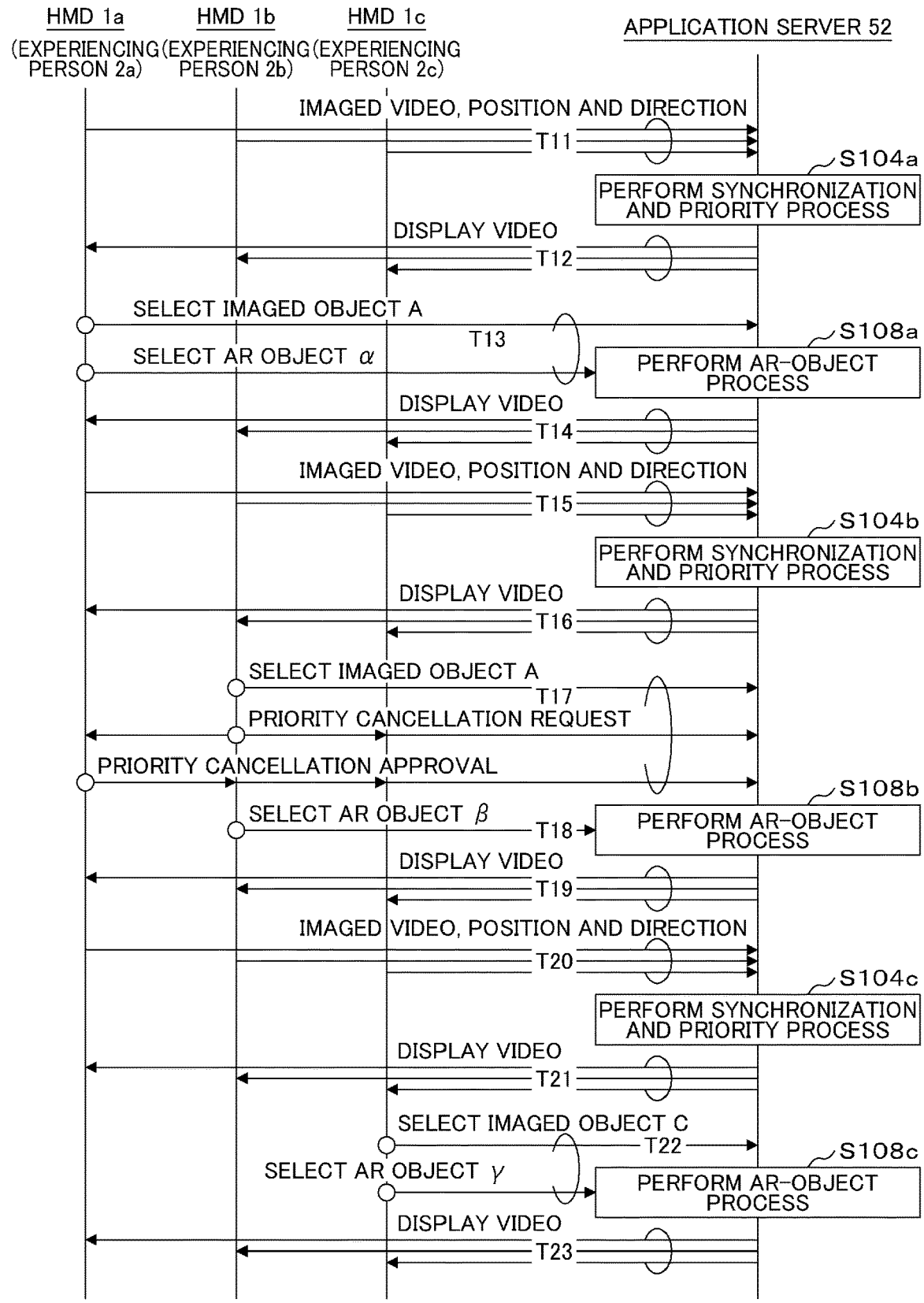
FIG. 18B is a chart illustrating details of sequences in FIG. 18A.

FIGS. 18A and 18B are sequence charts of the MR network system, illustrating data transmission and reception between each of the HMDs 1a, 1b, and 1c (each of the MR experiencing persons 2a, 2b, and 2c) and the application server 52.

FIG. 18A is a view illustrating an overall sequence. The similar processes to those in FIG. 5 in Example 1 are denoted by the same reference signs. This is configured by the log-in process of S101 to the display video generation process of S109. Also in this sequence, a pair of basic communication sequences of a request and a response is used, but this pair are omitted here to avoid complication of description. The outline will be described below in the order of processes.

S101: The MR experiencing persons 2a to 2c log in to the application server 52 and participate in an MR experience.

S102: The MR experiencing persons 2a to 2c perform camera imaging of a portion of a real space and transmit imaged video data to the application server 52.

S103: Further, the MR experiencing persons 2a to 2c transmit data of the position and direction to the application server 52, as reference point and movement history data.

S104: The application server 52 integrates pieces of the data of all MR experiencing persons, and synthesizes and synchronizes the videos.

S105: The application server 52 generates and transmits a display image of each of the MR experiencing persons (S105).

S106: The application server 52 processes the imaged object.

S107: The application server 52 processes the background object. At this time, an instruction of the divided region and a cross object is received from the MR experiencing person.

S108: The application server 52 processes an AR object. At this time, the data of the AR object selected for the designation and linking of the imaged object or the background object selected by the MR experiencing person is received.

S109: The application server 52 generates a display video reflecting the results of the performing and transmits the display video to the MR experiencing person. In addition, the data generated when the application is executed is stored in the data storage server 53.

In the above sequence, by repeating a series of sequences excluding the log-in of S101 as the basic sequence, the MR experiencing persons 2a to 2c realize the MR experience via the application server 52.

FIG. 18B is a chart illustrating details of sequences in FIG. 18A. Here, in order to avoid the complication of the description, only the repetition of the synchronization and priority process (S104) and the AR-object process (S108) in the processes of the basic sequence is illustrated. Other display video generation process (S105), imaged-object process (S106), and background-object process (S107) are omitted, but are executed as appropriate. In addition, the data, the display video, and the like are also appropriately stored in the data storage server 53. The contents of communication between the HMDs 1a to 1c (MR experiencing persons 2a to 2c) and the application server 52 will be sequentially described.

T11: Each imaged video, the position of the HMD, and the imaging direction are transmitted from the HMDs 1a to 1c to the application server 52. A transmission timing may be set in accordance with a transmission request from the application server 52, or the application server 52 may capture the continuously transmitted imaged videos at a convenient timing.

T12: The application server 52 performs a synchronization and priority process S104a, and transmits, for example, a display image such as an AR object having a display position which has been updated in response to the movement of the HMD, to each of the HMDs 1a to 1c.

T13: At this time, when the HMD 1a (MR experiencing person 2a) who has the priority of the imaged object A wants to link the AR object α to the imaged object A, the selection information of the imaged object A and the selection information of the AR object α to be linked are transmitted to the application server 52.

T14: The application server 52 performs an AR-object process S108a, and transmits the display video of the AR object α based on the setting information of the AR object α, to the HMD 1a and other HMDs 1b and 1c.

T15: A new imaged image, a new position of the HMD, and a new imaging direction are transmitted from the HMDs 1a to 1c to the application server 52.

T16: The application server 52 performs a synchronization and priority process S104b, and transmits a display video including the disposition of the AR object α to each of the HMDs 1a to 1c.

T17: After that, when the HMD 1b (MR experiencing person 2b) who does not have the priority of the imaged object A wants to link a different AR object β to the imaged object A, a request to cancel the priority assigned to the imaged object A is transmitted to the HMDs 1a and 1c, and the application server 52. When the HMD 1a (MR experiencing person 2a) holding the priority receives the request to cancel the priority from the HMD 1b, the priority is canceled, and the priority is assigned to the HMD 1b.

T18: The HMD 1b transmits the selection information of the AR object β linked to the imaged object A to the application server 52.

T19: The application server 52 performs an AR-object process S108b, and transmits the display video of the AR object β based on the setting information of the AR object β, to the HMDs 1a to 1c.

T20: A new imaged image, a new position of the HMD, and a new imaging direction are transmitted from the HMDs 1a to 1c to the application server 52.

T21: The application server 52 performs a synchronization and priority process S104c, and transmits a display video including the disposition of the AR object β to each of the HMDs 1a to 1c.

T22: At this time, it is assumed that the HMD 1c (MR experiencing person 2c) selects a different imaged object C and transmits a request to select the AR object γ, and this request is permitted. The HMD 1c transmits the selection information of the AR object γ to be added.

T23: The application server 52 performs an AR-object process S108c, and transmits the display video of the AR object γ based on the setting information of the AR object γ, to the HMDs 1a to 1c.

As a result, the HMD 1a to 1c (MR experiencing persons 2a to 2c) can share an imaged object in the same real space, add an AR object being a virtual object to the real space, and visually recognize a video of the added AR object as a display video generated corresponding to each position.

As described above, the MR network system in Example 3 has characteristics that it is possible to obtain the similar effects to those in Example 1, and to utilize resources such as the application server and the data server on the network. Thus, the effects of reducing the load on the MR display device, contributing to the size reduction and cost reduction of the MR display device, and facilitating the response even when the number of MR experiencing persons increases are obtained.

Example 4

In Example 4, an MR display device equipped with a 3D camera to perform imaging and distance measurement will be described.

[MR Display Device]

FIG. 19 is a view illustrating an appearance configuration of an MR display device 1' according to Example 4. The components having the equivalent functions to those of the MR display device 1 described in Example 1 (FIG. 2) are denoted by the same reference signs, and repetitive description will be omitted.

The MR display device 1' includes three-dimensional (3D) cameras 40a and 40b and a flat display 41. The 3D cameras 40a and 40b replace the camera 10 and the distance measurement sensor 11 in Example 1. Thus, the 3D cameras 40a and 40b can not only obtain a camera imaged video, but also measure a distance of a reality object in a camera video by a difference between a video of the left visual line obtained by the 40a and a video of the right visual line obtained by the 40b.

The flat display 41 replaces the 3D projector 13 and the transmissive screen 14 in Example 1. The controller 16 synthesizes and displays the imaged videos of the 3D cameras 40a and 40b and a video of the AR object. At this time, the video of the left visual line and the video of the right visual line are displayed alternately, and a 3D image is displayed in synchronization with the shutter-attached glasses 15. Incidentally, a general-purpose device such as a smartphone may be used for the flat display 41. At this time, the function of the controller 16 can be performed by a control device built in the smartphone.

Figure 20:
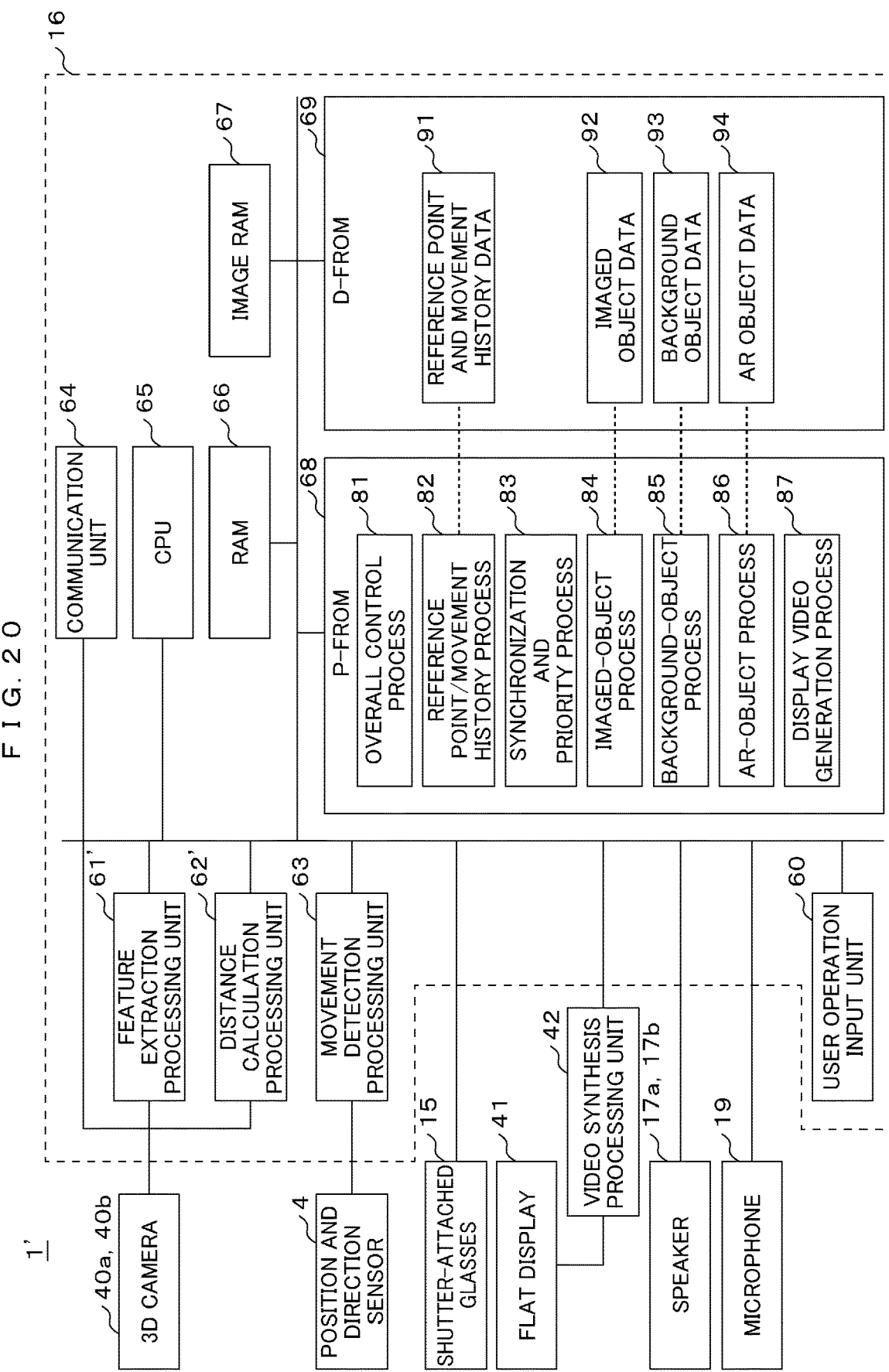
FIG. 20 is a block diagram illustrating a functional configuration of the MR display device 1'.

FIG. 20 is a block diagram illustrating a functional configuration of the MR display device 1'. Blocks having the equivalent functions to the blocks described in Example 1 (FIG. 3) are denoted by the same numbers, and repetitive descriptions are omitted. The blocks different from those in Example 1 are the 3D cameras 40a and 40b, the flat display 41, a video synthesis processing unit 42, and a feature extraction processing unit 61' and a distance calculation processing unit 62' in the controller 16.

The feature extraction processing unit 61' extracts feature points from videos of the 3D cameras 40a and 40b, and identifies the reality object in the camera imaged video from the feature points. The distance calculation unit 62' measures the distance of the reality object in the camera video by the difference between the videos of the left eye and right visual lines, which are obtained by the 3D cameras 40a and 40b. The synthesis processing unit 42 synthesizes the imaged videos of the 3D cameras 40a and 40b and the video of the AR object, and the flat display 41 displays the synthesized video.

According to Example 4, there are characteristics that the similar effects to those in Example 1 are obtained, and a general-purpose device such as a smartphone including a flat display can be utilized.

Although the examples of the present invention have been described above, the present invention is not limited to the above examples, and a part of the configuration of a certain example may be replaced with the configuration of another example, or the configuration of another example may be added.

REFERENCE SIGNS LIST

1(1a to 1c), 1' Mixed reality display device (MR display device, HMD)
2a to 2c MR experiencing person
3a to 3c Camera imaging angle of view
4 Reality object (background object)
5 Access point (AP)
6 to 8 Reality object (imaged object)
10 Camera
11 Distance measurement sensor
12 Position and direction sensor
13 3D projector
14 Transmissive screen
15 Shutter-attached glasses
16 Controller
17a, 17b Speaker
18a, 18b Holder
19 Microphone
21 to 26 AR object (virtual object)
40a, 40b 3D camera
41 Flat display
50 Gateway
51 Network
52 Application server
53 Data storage server
60 User operation input unit
61, 61' Feature detection processing unit
62, 62' Distance calculation processing unit
63 Movement detection processing unit
64 Communication unit
65 CPU
66 RAM
67 Image RAM
68 Program flash ROM
69 Data flash ROM
81 Overall control process
82 Reference point/movement history process
83 Synchronization and priority process
84 Imaged-object process 85 Background-object process
86 AR-object process
87 Display video generation process

The invention claimed is:

1. A mixed reality display method of providing a video of a virtual object with being superimposed on a reality video, to a mixed reality display device worn by an experiencing person,
wherein the mixed reality display device comprises a camera, a display, a memory and a communicator, and
wherein the mixed reality display method comprises:
a step of imaging a reality video by the camera,
a step of recognizing a reality object from the reality video imaged by the camera,
a step of linking a predetermined virtual object to the recognized reality object based on an operation of the experiencing person,
a step of storing data of the virtual object linked to the reality object in the memory,
a step of acquiring data of a reality object recognized by another mixed reality display device and a virtual object linked to the recognized reality object, via the communicator,
a step of synthesizing the data acquired via the communicator and the data stored in the memory,
a step of displaying a video obtained by the synthesis on the display, and
a step of editing of the virtual object linked to the reality object on the video displayed on the display, based on an operation of the experiencing person,
wherein the mixed reality display device further comprises a distance measurement sensor configured to measure a distance to a reality object in the reality video,
wherein, in the step of recognizing the reality object from the reality video imaged by the camera, recognizing the reality object to be classified into an imaged object and a background object, based on the distance measured by the distance measurement sensor, and
wherein, in the step of linking the predetermined virtual object to the recognized reality object, dividing a region of the background object into a plurality of regions and linking the virtual object to the one of the plurality of regions.

2. The mixed reality display method according to claim 1,
wherein the mixed reality display device further comprises a position and direction sensor configured to detect a position of the camera and an imaging direction, a reference point for the position of the camera and the imaging direction detected by the position and direction sensor is set to coincide with a reference point of a position of a camera and an imaging direction in the another mixed reality display device,
wherein, in the step of synthesizing the data acquired via the communicator and the data stored in the memory, viewpoint-transforming the video in accordance with the positions of the cameras and the imaging directions of the mixed reality display device and the another mixed reality display device and then performing synthesis, and
wherein, in the step of displaying the video obtained by the synthesis on the display, updating the video to a new video based on new positions of the cameras and new imaging directions every time the experiencing person moves.

3. The mixed reality display method according to claim 1, further compromising:
a step of assigning a priority flag indicating whether another experiencing person is allowed to change the linking for the virtual object, and
a step of storing a resultant of the assignment in the memory.

4. The mixed reality display method according to claim 1,
wherein the display is configured by a 3D projector that projects the video of the virtual object onto a transmissive screen, and
wherein the experiencing person is allowed to visually recognize the reality video seen through the transmissive screen and, at the same time, visually recognize the video of the virtual object on the transmissive screen.

5. The mixed reality display method according to claim 1,
wherein the virtual object linked to the reality object is configured by a plurality of components, and
wherein the mixed reality display method further comprises:
a step of assigning a priority flag indicating an edit authority of the virtual object to each of the components, and
a step of storing a resultant of the assignment in the memory.

6. A mixed reality display method of providing a video of a virtual object with being superimposed on a reality video, to a mixed reality display device worn by an experiencing person,
wherein the mixed reality display device comprises a camera, a display, a memory and a communicator, and
wherein the mixed reality display method comprises:
a step of imaging a reality video by the camera,
a step of recognizing a reality object from the reality video imaged by the camera,
a step of linking a predetermined virtual object to the recognized reality object based on an operation of the experiencing person,
a step of storing data of the virtual object linked to the reality object in the memory,
a step of acquiring data of a reality object recognized by another mixed reality display device and a virtual object linked to the recognized reality object, via the communicator,
a step of synthesizing the data acquired via the communicator and the data stored in the memory,
a step of displaying a video obtained by the synthesis on the display, and
a step of editing of the virtual object linked to the reality object on the video displayed on the display, based on an operation of the experiencing person,
wherein the virtual object linked to the reality object is configured by a plurality of components, and
wherein the mixed reality display method further comprises:
a step of assigning a priority flag indicating an edit authority of the virtual object to each of the components, and
a step of storing a resultant of the assignment in the memory.

7. The mixed reality display method according to claim 6,
wherein the mixed reality display device further comprises a distance measurement sensor configured to measure a distance to a reality object in the reality video, and
wherein the mixed reality display method further comprises:

a step of evaluating a distance between the reality object and the virtual object by the distance measurement sensor, a step of setting a portion or an entirety of the virtual object not to be displayed when the reality object is in front of the virtual object, and a step of performing masking on the reality object by displaying the background object when the reality object indicates another experiencing person.

8. The mixed reality display method according to claim 7, wherein a 3D camera capable of imaging a reality video and measuring a distance to a reality object in the reality video is provided as the camera and the distance measurement sensor, and wherein the display is a flat display that displays a result obtained by synthesizing a video of a virtual object with the reality video imaged by the 3D camera.

9. The mixed reality display method according to claim 6, wherein the mixed reality display device further comprises a position and direction sensor configured to detect a position of the camera and an imaging direction, a reference point for the position of the camera and the imaging direction detected by the position and direction sensor is set to coincide with a reference point of a position of a camera and an imaging direction in the another mixed reality display device, wherein, in the step of synthesizing the data acquired via the communicator and the data stored in the memory, viewpoint-transforming the video in accordance with the positions of the cameras and the imaging directions of the mixed reality display device and the another mixed reality display device and then performing synthesis, and wherein, in the step of displaying the video obtained by the synthesis on the display, updating the video to a new video based on new positions of the cameras and new imaging directions every time the experiencing person moves.

10. The mixed reality display method according to claim 6, wherein the display is configured by a 3D projector that projects the video of the virtual object onto a transmissive screen, and wherein the experiencing person is allowed to visually recognize the reality video seen through the transmissive screen and, at the same time, visually recognize the video of the virtual object on the transmissive screen.

11. A mixed reality display method of providing a video of a virtual object with being superimposed on a reality video, to a display device, wherein the display device comprises a camera, a display, a memory and a communicator, and wherein the mixed reality display method comprises the steps of:

imaging a reality video by the camera, recognizing a reality object from the reality video imaged by the camera, linking a predetermined virtual object to the recognized reality object based on an operation of a user of the display device, storing data of the virtual object linked to the reality object in the memory, acquiring data of a virtual object linked to a reality object recognized by another display device, via the communicator, synthesizing the data acquired via the communicator and the data stored in the memory, displaying a video obtained by the synthesis on the display, and editing of the virtual object linked to the reality object on the video displayed on the display, based on an operation of the user, wherein the display device further comprises a distance measurement sensor, wherein the mixed reality display method further comprises the steps of:

measuring a distance to a reality object in the reality video by the distance measurement sensor, recognizing the reality object to be classified into an imaged object and a background object, based on the distance measured by the distance measurement sensor, and dividing a region of the background object into a plurality of regions and linking the virtual object to the one of the plurality of regions.

12. The mixed reality display method according to claim 11, wherein the display device further comprises a position and direction sensor configured to detect a position of the camera and an imaging direction, a reference point for the position of the camera and the imaging direction detected by the position and direction sensor is set to coincide with a reference point of a position of a camera and an imaging direction in the another display device, wherein the mixed reality display method further comprises the steps of:

viewpoint-transforming the video in accordance with the positions of the cameras and the imaging directions of the display device and the another display device and then performing synthesis, and updating the video to a new video based on new positions of the cameras and new imaging directions every time the user moves.

13. The mixed reality display method according to claim 11, wherein the virtual object linked to the reality object is configured by a plurality of components, and wherein the mixed reality display method further comprises the steps of:

assigning a priority flag indicating an edit authority of the virtual object to each of the components, and storing a resultant of the assignment in the memory.

14. The mixed reality display method according to claim 11, further compromising the steps of:

assigning a priority flag indicating whether another user is allowed to change the linking for the virtual object, and storing a resultant of the assignment in the memory.

15. The mixed reality display method according to claim 11, wherein the display is configured by a 3D projector that projects the video of the virtual object onto a transmissive screen, and wherein the user is allowed to visually recognize the reality video seen through the transmissive screen and, at the same time, visually recognize the video of the virtual object on the transmissive screen.

16. A mixed reality display method of providing a video of a virtual object with being superimposed on a reality video, to a display device, wherein the display device comprises a camera, a display, a memory and a communicator, and wherein the mixed reality display method comprises the steps of:

imaging a reality video by the camera,
recognizing a reality object from the reality video imaged by the camera,
linking a predetermined virtual object to the recognized reality object based on an operation of a user of the display device,
storing data of the virtual object linked to the reality object in the memory,
acquiring data of a virtual object linked to a reality object recognized by another display device, via the communicator,
synthesizing the data acquired via the communicator and the data stored in the memory,
displaying a video obtained by the synthesis on the display, and
editing of the virtual object linked to the reality object on the video displayed on the display, based on an operation of the user,
wherein the virtual object linked to the reality object is configured by a plurality of components, and
wherein the mixed reality display method further comprises the steps of:
assigning a priority flag indicating an edit authority of the virtual object to each of the components, and
storing a resultant of the assignment in the memory.

17. The mixed reality display method according to claim 16,
wherein the display device further comprises a position and direction sensor configured to detect a position of the camera and an imaging direction, a reference point for the position of the camera and the imaging direction detected by the position and direction sensor is set to coincide with a reference point of a position of a camera and an imaging direction in the another display device,
wherein the mixed reality display method further comprises the steps of:
viewpoint-transforming the video in accordance with the positions of the cameras and the imaging directions of the display device and the another display device and then performing synthesis, and
updating the video to a new video based on new positions of the cameras and new imaging directions every time the user moves.

18. The mixed reality display method according to claim 16,
wherein the display device further comprises a distance measurement sensor configured to measure a distance to a reality object in the reality video, and
wherein the mixed reality display method further comprises the steps of:
evaluating a distance between the reality object and the virtual object by the distance measurement sensor,
setting a portion or an entirety of the virtual object not to be displayed when the reality object is in front of the virtual object, and
performing masking on the reality object by displaying the background object when the reality object indicates another user.

19. The mixed reality display method according to claim 18,
wherein a 3D camera capable of imaging a reality video and measuring a distance to a reality object in the reality video is provided as the camera and the distance measurement sensor, and
wherein the display is a flat display that displays a result obtained by synthesizing a video of a virtual object with the reality video imaged by the 3D camera.

* * * * *